(12) United States Patent
Davis et al.

(10) Patent No.: US 6,751,241 B2
(45) Date of Patent: Jun. 15, 2004

(54) MULTIMODE FIBER LASER GRATINGS

(75) Inventors: Monica K. Davis, Belmont, MA (US); Matthew J. Dejneka, Corning, NY (US); John D. Minelly, Painted Post, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 271 days.

(21) Appl. No.: 09/968,354

(22) Filed: Sep. 27, 2001

(65) Prior Publication Data

US 2003/0063629 A1 Apr. 3, 2003

(51) Int. Cl.[7] .................................................. H01S 3/00
(52) U.S. Cl. .................................. 372/6; 372/48; 372/75
(58) Field of Search ................................................ 372/6

(56) References Cited

U.S. PATENT DOCUMENTS

| | | | |
|---|---|---|---|
| 5,373,576 A | 12/1994 | Minns et al. ............... 385/126 |
| 5,422,897 A | * 6/1995 | Wyatt et al. .................... 372/6 |
| 5,473,622 A | 12/1995 | Grubb ............................ 372/6 |
| 5,530,710 A | 6/1996 | Grubb ............................ 372/6 |
| 5,659,644 A | 8/1997 | DiGiovanni et al. .......... 385/31 |
| 5,761,234 A | * 6/1998 | Craig et al. ................. 372/275 |
| 5,774,484 A | 6/1998 | Wyatt et al. .................... 372/6 |
| 5,848,204 A | 12/1998 | Wanser ......................... 385/12 |
| 5,864,644 A | 1/1999 | DiGiovanni et al. .......... 385/43 |
| 5,905,745 A | * 5/1999 | Grubb et al. ................... 372/6 |
| 5,953,353 A | * 9/1999 | Headley et al. ................ 372/6 |
| 5,974,212 A | 10/1999 | Saeki ........................... 385/37 |
| 5,991,314 A | * 11/1999 | Ionov et al. .................... 372/6 |
| 6,061,172 A | 5/2000 | Naito et al. .................. 359/341 |
| 6,061,849 A | 5/2000 | Seals ............................. 372/6 |
| 6,167,075 A | 12/2000 | Craig et al. ................... 372/75 |
| 6,240,108 B1 | 5/2001 | Ionov ............................. 372/6 |
| 6,282,016 B1 | 8/2001 | MacCormack et al. ..... 359/341 |

FOREIGN PATENT DOCUMENTS

EP    0 905 834 B1    7/2001

OTHER PUBLICATIONS

"High power diode pumped single-transverse-mode Yb fiber laser operating at 978nm." Minelly, et al PD2–1.
"Novel Fiber Devices and Sensors Based on Multimode Fiber Bragg Gratings" Wasner, et al Navel Research Laboratory.
"Multimode Fiber Gratings—Spectral Charactristics and Applications" Mizunami, et al ECOC 97, Sep. 22–25, 1997, Conference Publication No. 448.
"A Narrow–Spectrum Vertical–Cavity Surface–Emitting Laser Incorporating a Multimode Fiber Bragg Grating" Mizunami, et al Bragg Graings, Photosensitivity, and Poling in Glass Waveguides 1999 Technical Digest.
"Simultaneous Sensing of Temperature and Displacement Using a Multimode Fiber Bragg Grating" Djambove Jpn. J. Appl. Phys. vol. 39 (2000) 1566–1570.
"Fiber Grating Spectra" Erogan, J. of Lightwave Technology, vol. 15 No. 8, Aug. 1997.

* cited by examiner

Primary Examiner—Paul Ip
Assistant Examiner—Dung T Nguyen
(74) Attorney, Agent, or Firm—Juliana Agon

(57) ABSTRACT

An optically active waveguide laser (30) includes a multimode portion (126) for carrying more than one spatial mode at a predetermined wavelength chosen from a bandwidth including a pump wavelength (64) and the lasing wavelength (66). The multimode portion (126) has a first refractive index. A cladding portion (386) is proximate the multimode portion (126). A multimode grating (60, 56, or 62) is written on at least one section (26) of the multimode portion for reflecting the predetermined wavelength.

46 Claims, 13 Drawing Sheets

MULTIMODE FIBER LASER GRATINGS

CLAIM OF PRIORITY

This application claims the benefit of U.S. patent application Ser. No. 09/378,770 filed Aug. 20, 1999, Ser. No. 09/426,460 filed Jan. 8, 1999 and Ser. No. 09/808,270 filed Mar. 14, 2001.

BACKGROUND OF THE INVENTION

1. Field of the Invention

The present invention relates generally to gratings for active fibers, and in particular to a multimode grating for 3-level double-clad fiber and tapered fiber lasers.

2. Technical Background

Optical fiber is the favored transmission medium for telecommunications due to its high capacity and immunity to electrical noise. Silica optical fiber is relatively inexpensive, and when fabricated as a single transverse mode fiber can transmit signals in the 1550 nm band for many kilometers without amplification or regeneration. However, a need still exists for optical amplification in many fiber networks, either because of the great transmission distances involved, or the optical signal being split into many paths.

As illustrated schematically in FIG. 1, a conventional amplifier 10 is interposed between an input transmission fiber 12 and an output transmission fiber 14. Erbium-doped fiber amplifiers (EDFAs) have been found quite effective in providing the required optical gain, as one example of the amplifier 10. Another example of the amplifier 10 is a fiber with Raman gain. Both transmission fibers 12, 14 need to be single-mode, because higher-order modes exhibit much greater dispersion (typically the limiting factor for the fiber transmission distance at high data rates). The EDFA 10 includes a length (on the order of tens of meters) of an erbium-doped silica fiber 16, as is well known in the art. It is well known that an erbium optical fiber amplifier operating in its purely three-level mode is capable, when pumped at a wavelength of 980 nanometers (nm) of amplifying optical signals having a wavelength of 1550 nm. The doped fiber 16 should also be single-mode in order to maintain the transmission signal integrity. The doped fiber 16 is optically active due to the presence of $Er^{3+}$ ions or other rare-earth ions, which can be excited to higher electronic energy levels when the doped fiber 16 is pumped by a strong optical pump. Typically, an optical pump source 18 inputs the pump into the doped fiber 16 through a pump source fiber 20 coupled to either the undoped upstream fiber 12 or the doped fiber 16 through a wavelength-selective directional coupler 22, but downstream coupling is also known. For efficient coupling into the single-mode Er-doped fiber 16, the pump source fiber 20 should also be single-mode. An operative EDFA may contain some additional elements (such as an isolator or a gain-flattening filter), which are well known to the art but not relevant to the understanding of the background of the present invention.

Conventionally, one typical pump source 18 has been an edge-emitting semiconductor laser that includes a waveguide structure (in what is called a "stripe" structure) that can be aligned with the single-mode pump source fiber 20 to provide effective power coupling. However, this approach has failed to keep up with modern fiber transmission systems incorporating wavelength-division multiplexing (WDM). In one approach to WDM, a number of independent lasers inject separately modulated optical carrier signals of slightly different wavelengths into the transmission fiber 12. The EDFA has sufficient bandwidth to amplify carrier signals within about a 40 nm bandwidth. A large number of multiplexed signals to be amplified require in aggregate a proportionately large amount of pump power. Over the past decade, the number of WDM channels preferably utilized in a standard network has increased from about four to current levels of forty or more, but at best the output power from a single-stripe laser source has only doubled.

In search for a higher powered laser source, the broad-area diode laser remains the most efficient and least expensive pump source. Recent progress in semiconductor laser technology has led to creation of a broad-area laser diodes with output powers of up to 16 W. Devices 100 $\mu$m wide with a slow-axis numerical aperture (NA) of less than 0.1 and output power of 4 Watts at 920 and 980 nm are now passing qualification testing for telecommunication applications. With proper coupling optics, the beam of such a laser diode can be focused into a spot as small as 30×5 $\mu$m with an NA of less than 0.35 in both transverse directions. The optical power density in such a spot is ~1.3 $MW/cm^2$, which should be high enough to achieve transparency in 3-level laser systems.

One approach for utilizing inexpensive high-power broad-area pump lasers involves cladding-pumped, or double-clad fiber designs for the optical pump 18. The advantages of cladding-pumped fiber lasers are well known. Such a device effectively serves as a brightness converter, converting a significant part of the multimode pump light into a single-mode output at a longer wavelength.

Cladding pumping can be employed to build a separate high-power single mode fiber pump laser. A source based on the pure three-level 978 nm $Yb^{+3}$ transition has long been suggested as a pump for EDFAs because this wavelength is close to the desired pumping wavelength of 980 nm. However, the cladding-pumped technique has been determined in practice to be ineffective for pumping pure three-level fiber lasers, such as the 980 nm transition of ytterbium, because of various fiber laser design parameters that have to be satisfied.

Practical double-clad amplifiers and lasers have been mostly limited to 4-level systems. Double-clad fiber lasers offer better performance for four-level lasing (where the lasing occurs in a transition between two excited states) than for the three-level one (where the lasing transition is between the excited and the ground state). For example, for the rare-earth ion, Ytterbium (Yb), the three-level transition is at 978 nm and competing higher-gain four-level transition is at about 1030–1100 nm.

In a double-clad laser, an outer cladding confines the pump light from a primary pump source in a large cross-sectional area multimode inner cladding. The much smaller cross-sectional area core is typically doped with at least one rare-earth ion, for example, neodymium or ytterbium, to provide lasing capability in a single-mode output signal. Typically, a neodymium-doped or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030–1120 nm, respectively). Thus, conventional double-clad arrangements facilitate pumping of the fiber using a multimode first cladding for accepting and transferring pump energy to a core along the length of the device. The double-clad laser output can be used to pump a cascaded Raman laser to convert the wavelength to around 1480 nm, which is suitable for pumping erbium. To date, a double-clad design by itself (that is, without an additional Raman converter) does not produce a sufficiently high output in any of the appropriate absorption bands for EDFAs or is not available commercially.

How much pump light can be coupled into a double-clad fiber inner cladding depends on the cladding size and NA. As is known, the "etendue" (numerical aperture multiplied by the aperture dimension or spot size) of the fiber should be equal to or greater than the etendue of the pump source for efficient coupling. The numerical aperture and spot size may be different in both axes so there may be an etendue in the x and y directions that must be maintained or exceeded.

Typically, a high numerical aperture $NA_{clad}$, related to the difference in refractive index between the first and second cladding is desired. If there are two claddings instead of one, the index of the first cladding is $n_{clad,1}$ and the index of the second cladding is $n_{clad,2}$ such that $NA_{clad}=(n_{clad,1}^2-n_{clad,2}^2)^{1/2}$. In the well-known design, the first clad layer is made of glass and the second is made of plastic (fluorinated polymer) with a relatively low refractive index in order to increase the numerical aperture $NA_{clad}$. Such plastic may not have the desired thermal stability for many applications, may delaminate from the first cladding, and may be susceptible to moisture damage.

In known double-clad host fibers, the laser cavity is formed by an input dielectric mirror which transmits the 920-nm pump band and reflects the desired 980-nm lasing band. For any input mirror of the fiber laser, it is a desire to reflect only the fundamental mode, at the laser wavelength, e.g., 978 nm, to form the input end of the optical cavity. A dielectric mirror at the end of the double-clad fiber or a weak fiber Bragg grating in the single-mode fiber, e.g., Corning® CS-980 fiber, coupled to the coupling end of the double-clad fiber serves as the output coupler for providing the output end of the cavity.

One of the primary technical challenges in a high power fiber laser is the formation of the input dielectric mirror across the multimode inner cladding of the double-clad fiber. Approaches include attaching a glass micro-sheet to the fiber endface or directly depositing a thin-film dielectric on the fiber endface, but both of these methods present their own technical hurdles.

A two-stage fiber laser has also been proposed as an alternate optical pump 18. This two-stage laser has an optical pump source to provide a pump light at a pump wavelength. A first waveguide portion which when optically pumped at the pump wavelength is capable of lasing with an emission at a lasing wavelength. The first waveguide portion exhibits multi-transverse-mode behavior at the lasing wavelength. A second waveguide portion exhibiting a substantially single transverse mode behavior at the lasing wavelength is optically coupled together with the first waveguide portion. An optical cavity is defined by a multimode grating on the first waveguide portion and a single mode grating on the second waveguide portion and includes the first and second waveguide portions. The delta index or contrast index of the difference between the cladding refractive index and the multimode core refractive index is between 0.04 to 0.06 for the low indexed germania (Ge) doped silicates multimode fibers of this approach.

As is known, the terminology "fiber Bragg grating" refers to a grating in which incident light is reflected back along the same fiber by a "short period" (a.k.a. Bragg) grating in the fiber and the fabrication of gratings is known. Fiber Bragg gratings (FBGs) couple power from one mode to another provided that the propagation constants of the two modes satisfy the following grating equation:

$$\beta_1 - \beta_2 = \frac{2\pi}{\Lambda} \qquad \text{Eq. (1)}$$

where $\beta_1$ and $\beta_2$ are the propagation constants of the two modes, $\Lambda$ is the grating period in the fiber, and first order diffraction is assumed for simplicity. When a forward propagating mode reflects into the identical backwards propagating mode, the Bragg condition becomes $\lambda_B=2n_{eff}\Lambda$, where $n_{eff}$ is the effective index of the mode ($\beta=(2\pi/\lambda)n_{eff}$) and lies between the core index $n_{core}$ and the cladding index, $n_{clad}$ for guided modes ($n_{clad}<n_{eff}<n_{core}$). Forward propagating modes may also reflect into other modes when mode orthogonality is no longer maintained, for example when UV induced index changes due to the FBG itself perturb the index profile sufficiently. The index profile needed depends on fiber geometry, cladding material, and the exact wavelengths for the particular application.

As with the double-clad fiber laser, to enable the maximum launch of optical power from the high power pump source into the laser cavity of either the double-clad fiber or the two-stage multimode to single-mode fiber laser, the optical cavity needs to have a large numerical aperture (NA) which is related to the index contrast. However, an increased index delta for proving power enhancement requires more design, testing, and manufacturing complexities to be first solved.

Therefore there is a continued need to increase the power output of a fiber laser, whether double-clad or two-staged, while increasing the reliability and simplifying the packaging and manufacturing of the fiber laser, which will also reduce the cost of the fiber laser.

SUMMARY OF THE INVENTION

In an embodiment of the invention, an optically-active waveguide laser includes a multimode portion for carrying more than one spatial mode at a predetermined wavelength. The multimode portion has a first refractive index. A cladding portion proximate the multimode portion has a second refractive index lower than the first index by at least 0.1 for power enhancement. A multimode grating is written on at least one section of the multimode portion for reflecting the predetermined wavelength.

In another aspect of the invention, the optically active fiber is used for making a fiber laser. This double-clad structured active fiber has a core doped with an optically excitable ion having a three-level transition. The core has a core refractive index and a core cross-sectional area. An inner cladding surrounds the core. The inner cladding has an inner cladding refractive index less than the core refractive index, an inner cladding cross-sectional area between 2 and 25 times greater than that of the core cross-sectional area, and an aspect ratio greater than 1.5:1. An outer cladding surrounds the inner cladding and has an outer cladding refractive index less than the inner cladding refractive index.

The fiber laser or amplifier includes an optical fiber having a core doped with an ion such as erbium ($Er^{3+}$), neodymium ($Nd^{3+}$) or ytterbium ($Yb^{3+}$), which can be optically pumped.

In another aspect of the invention, the active fiber and a single-mode output fiber are both designed to provide equal mode field diameters for the lowest-order mode at the junction and the multimoded photosensitivity-doped inner cladding cross-section has an elongated shape with an aspect ratio matching that of the pumping diode laser where at least one multimode grating is written.

The invention is particularly advantageous when used as a pump source for an erbium-doped fiber amplifier (EDFA) or for the EDFA itself, such as may be found in single-mode fiber optic communication systems or networks.

DETAILED DESCRIPTION OF THE PREFERRED EMBODIMENTS

Figure 2:
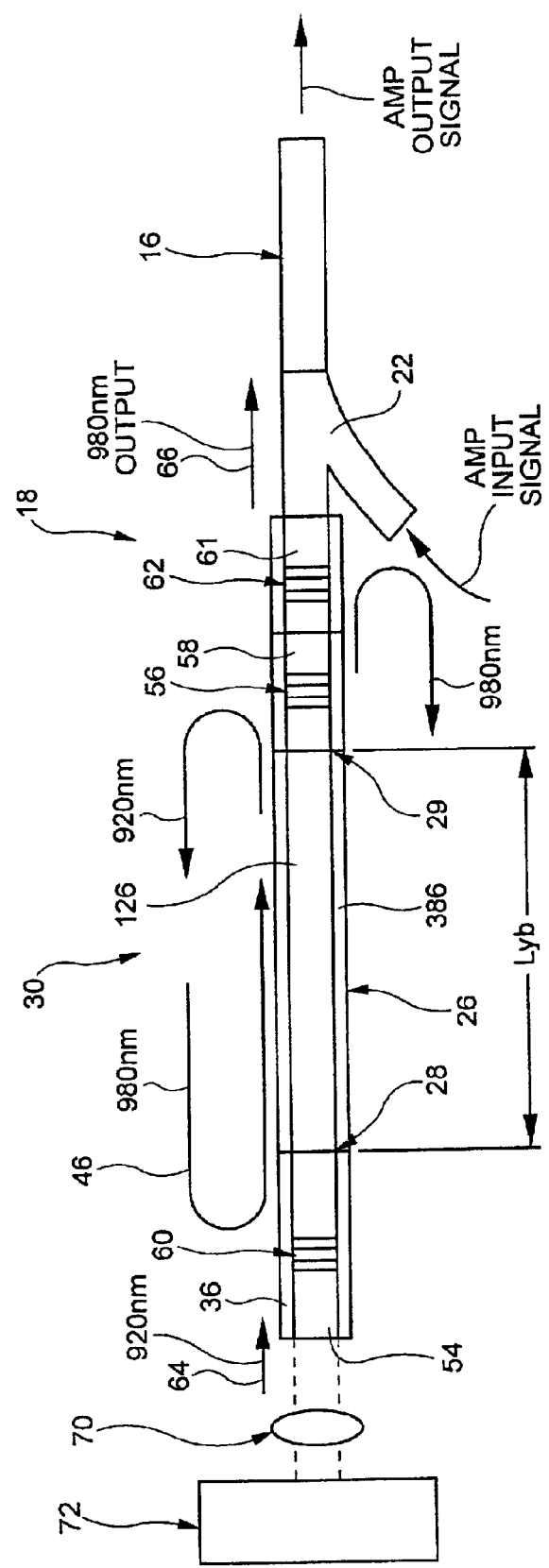
FIG. 2 is a schematic view of an optically active fiber 30 used in the system of FIG. 1 as a pump, according to the present invention.

The optically-active fiber, brightness converter, fiber laser, or dielectric waveguide laser of the present invention is shown in FIG. 2 and is generally described and depicted herein with reference to several exemplary or representative embodiments with the same numbers referenced to the same or functionally similar parts. In general, different design considerations need to be traded-off to provide a high-powered three-level transition fiber laser that can be embodied in different ways.

Figure 1:
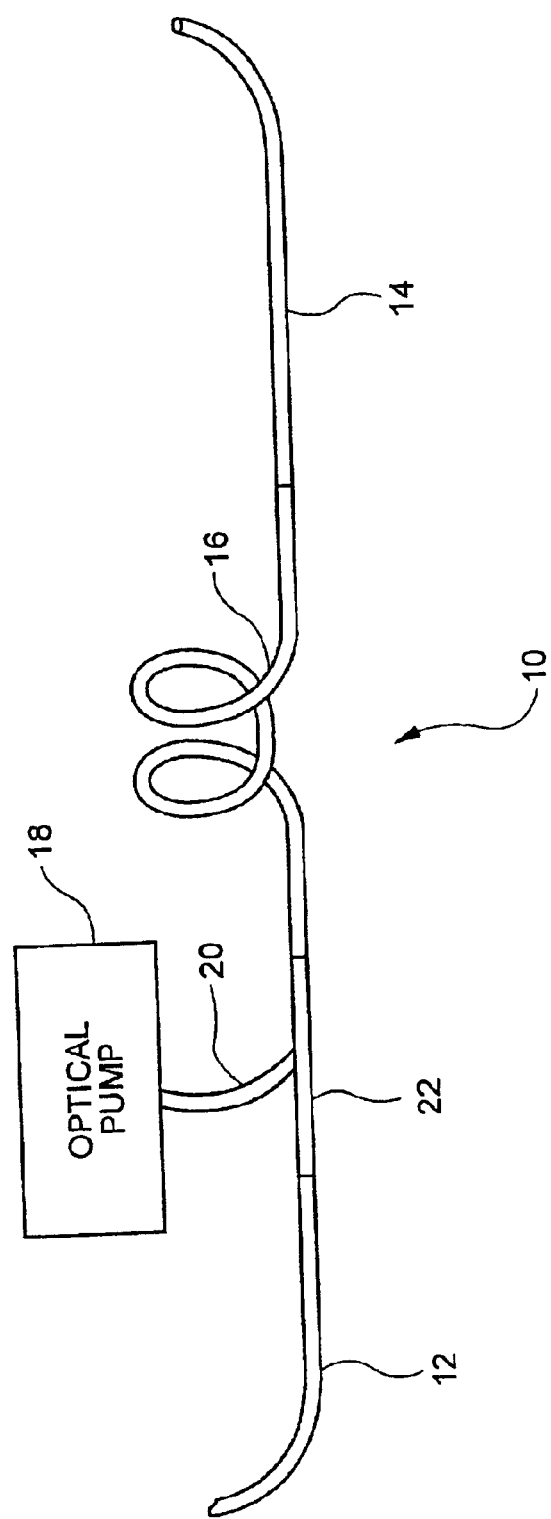
FIG. 1 is a schematic illustration of a prior art erbium-doped fiber amplifier (EDFA) used in a typical fiber optic telecommunications system.

Referring to FIG. 2, an optically-active waveguide laser 30, for use as a fiber laser for providing the optical pump 18 of FIG. 1, includes a multimode portion 126 for carrying more than one spatial mode at a predetermined wavelength chosen from a bandwidth including a pump wavelength 64 and the lasing wavelength 66. The multimode portion 126 has a first refractive index. A cladding portion 386 proximate the multimode portion 126 has a second refractive index lower than the first index by preferably at least 0.1 for power enhancement. A multimode grating 60, 56, or 62 is written on at least one section 26 of the multimode portion for reflecting the predetermined wavelength.

For the multimode grating 56, used as a multimode (MM) pump reflector, the predetermined wavelength is any wavelength 64 of the pump bandwidth. The MM pump reflector 56 is designed to reflect the maximum power or as much as can be reflected of the total amount of power at all wavelengths in the pump spectrum (e.g., across the full bandwidth of the pump or multiplexed pumps), and at all or as many as possible modes of all wavelengths in the pump bandwidth. The multimode pump reflector 56 is more power-efficient than a single-mode pump reflector and more efficient than a pump reflector placed outside of the MM section 126, due to the power reflected in the other modes.

For the multimode gratings 60 and 62, as used as a pair of multimode fiber Bragg grating (MM FBG) signal mirrors, the predetermined wavelength to be reflected is the lasing wavelength. The MM FBG signal mirrors 60 and 62 are designed to reflect only the fundamental mode of the desired signal (lasing) wavelength 66. It may reflect higher order modes (HOM) at other wavelengths as well, due to its MM nature. However, as long as these higher order modes do not fall within the gain peak of the fiber laser 30, the HOMs are not detrimental. The signal mirror has high reflectivity when the multimode grating 60 is to be used as the cavity high reflector (100% signal reflective and pump transparent) near the input end 28 of the lasing waveguide 26 or low reflectivity (about 4% reflection) if the multimode grating 62 is to be used as an output coupler, near the output end 29 of the lasing waveguide 26. The end mirror or output coupler 62 is preferably a low-reflectivity grating offering a 4% reflection that can provide signal feedback and act as an output coupler or low cavity signal mirror. Hence, the input multimode grating 60 is made highly transmissive to the optical pump signal 64 at the pump wavelength $\lambda_P$ and highly reflective at the signal (lasing) wavelength $\lambda_S$ of the output signal 66 while the output grating mirror 62 is made partially reflective (partially transmissive) at the signal wavelength $\lambda_S$ for allowing some of the standing waves in the optical cavity to pass and preferably also at least partially reflective at the pump wavelength. Thus, output coupler 62 and high reflector or input mirror 60 are fiber Bragg gratings that provide reflectivity of light to benefit the lasing operation to form the optical cavity. Hence, these end mirrors 60, 62 are reflecting the fundamental signal mode of the signal at the lasing wavelength, and not the pump wavelength.

The increased need for 980-nm band pump power in erbium-doped fiber amplifiers has led to continuing refinement of a high power fiber laser using the optically-active waveguide laser 30. The fiber laser or optically-active waveguide 30 is preferably doped with Ytterbium (Yb) as one example of the optically excitable active dopant within the lasing waveguide section 26 for operating or lasing at the lasing wavelength 66 of about 980 nm, with an output fiber laser power of at least 3 W, when irradiated on the input side or otherwise pumped by the pump wavelength of a pump signal 64 at wavelength $\lambda_P$ at around 920 nm, at a pump power output of at least 1W.

Figure 10:
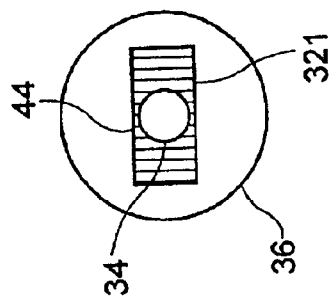
FIG. 10 is a cross-sectional representation of a rectangular shape 321 of the inner cladding 32 of the active fiber 30 of FIG. 3, according to the present invention.
Figure 14:
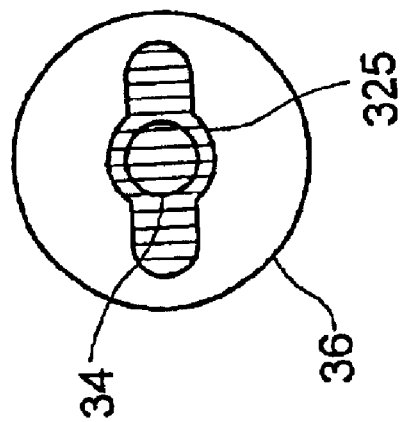
FIG. 14 is a cross-sectional representation of a Saturn-like shape 325 of the inner cladding 32 of the active fiber 30 of FIG. 3, according to the present invention.

As shown in FIG. 2, a lasing waveguide 30 preferably includes at least one fiber Bragg grating. Fiber Bragg gratings provide a beneficial means of reflecting light in an optical fiber waveguide format. Although interference filters or dielectric depositions can be used as one or both of the end mirrors 60, 62, Bragg grating reflectors are preferable and can be conventionally written directly onto fibers by UV patterning. To facilitate UV patterning, the multimode section 126 is doped with a photosensitive dopant, such as germanium (Ge). The multimode gratings 60, 56, and 62 are more reliable and easier to fabricate directly on the waveguide than a dielectric mirror deposited on the cleaved or polished end of the fiber. Fiber Bragg gratings thus provide a preferred solution to the use of micro-optic mirrors on the input end of a high power fiber laser. A fiber Bragg grating (FBG) written directly into the multimode core of the Yb-doped tapered fiber or the multimode inner cladding of a double-clad structure can be designed with the required reflection and transmission characteristics. By writing directly into the core (as represented by the multimode gratings 60 and 56 in the multimode core of FIG. 4 or the grating in the inner single mode core of FIG. 12 of a double-clad embodiment, or single mode grating 62 in FIG. 4 of a "tapered" fiber laser embodiment), the inner cladding (as represented in FIGS. 10, 13, and FIG. 6) or both the cladding and core (as represented by FIGS. 3, 5, 11, and 14) the reliability risks associated with micro-optic mirror approaches can be eliminated.

Lasing waveguide 30 includes a high reflector or multimode input mirror 60 proximate Yb doped optical waveguide input end 28. High reflector or multimode input mirror 60 is centered about the lasing signal wavelength, such as about 980 nm, and is highly reflective so as to benefit the output of 980 nm light from the lasing waveguide.

As another multimode grating, the lasing waveguide 30 includes the output coupler 62 proximate the Yb doped optical waveguide output end 29. Output coupler 62 is centered about the lasing wavelength, such as 980 nm, and is less reflective than the high reflector or input mirror 60 so as to benefit the output of the lasing wavelength, the 980 nm light, from the lasing waveguide.

Pump reflector 56 is also a multimode fiber Bragg grating that provides beneficial reflections. The lasing waveguide 30 also includes the pump reflector 56 proximate the Yb doped optical waveguide output end 29. The multimode pump reflector 56 is centered about the pumping wavelength, such as 920 nm or 946 nm, and is highly reflective so that the 920 or 946 nm pump light that reaches the end of the Yb doped waveguide is contained in the Yb doped waveguide 26 so that it can pump Yb ions into the proper excited state.

These fiber Bragg gratings can be made in separate optical waveguide fibers, such as dummy or un-actively-doped portions 54, 58, and 61, which are spliced together with an intra-cavity Yb doped optical waveguide section 26, which can be a fiber or a planar waveguide, to form the pumped cavity or intra-cavity of the optical cavity in lasing waveguide 30 or could be part of the same unitary, integral, and complete single optical lasing waveguide 26 or spliced variations thereof.

Whether double clad or double-staged, the optically active waveguide 30 incorporates a multimode portion 126. The fiber laser cavity, defined by multimode grating mirrors or reflectors 60 and 62, may either be within an improved double-clad host fiber 30, in which case the inner core 34 is designed for a single-mode output in FIG. 3, or may be within an improved double-stage laser incorporating a mode-selecting filter 300 as shown in FIG. 4 for the Yb-doped mode transformed or tapered fiber laser (YTFL). To those knowledgeable in the art, many concepts for a double-clad laser will be easily applied to the tapered fiber laser and will not be discussed again for the tapered fiber laser application. For example, the maximum area of the inner cladding will be similar to the maximum area of the multimode core of the tapered fiber laser.

Figure 3:
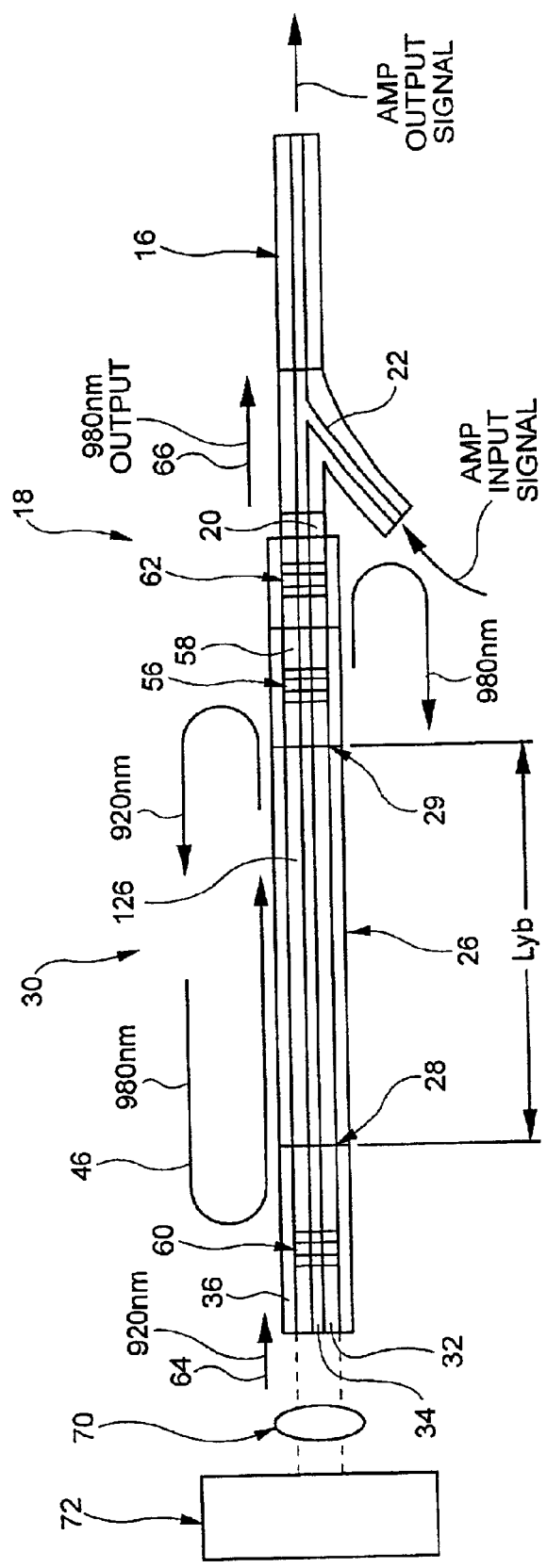
FIG. 3 is a schematic illustration of using the active fiber 30 of FIG. 2, as a double-clad fiber laser, in a first embodiment, according to the present invention.
Figure 4:
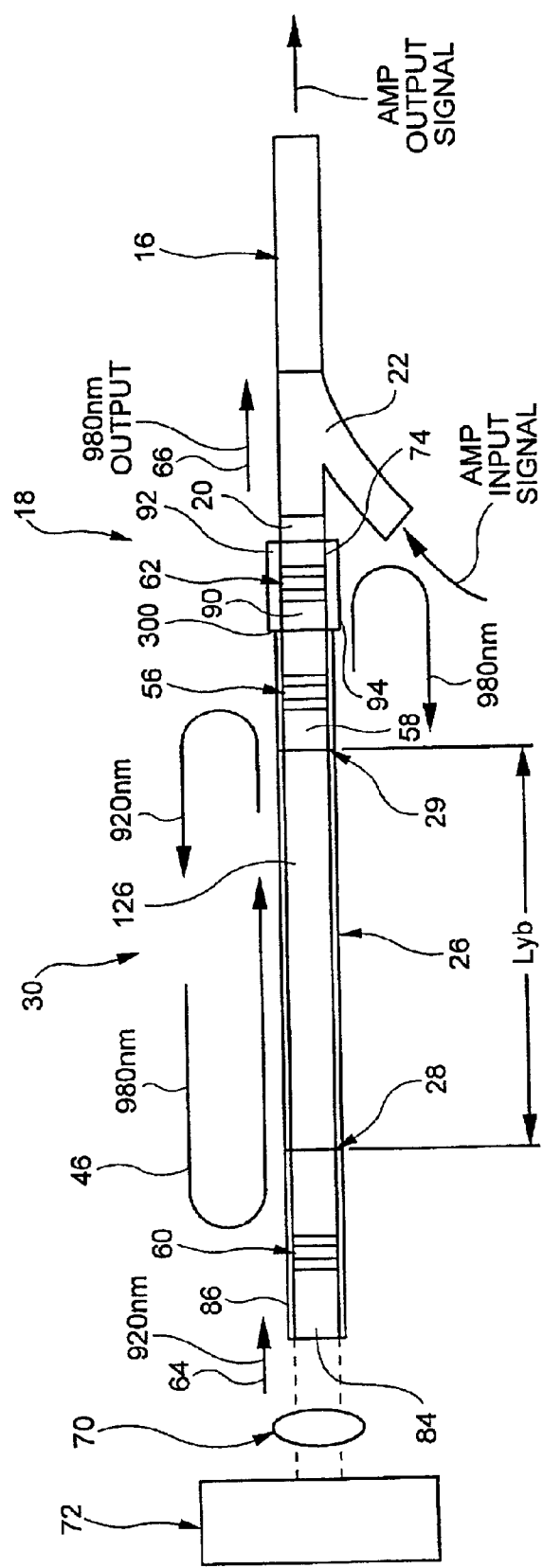
FIG. 4 is a schematic illustration of using the active fiber 30 of FIG. 2, as a mode-transformed fiber laser, in a second embodiment, according to the present invention.
Figure 5:
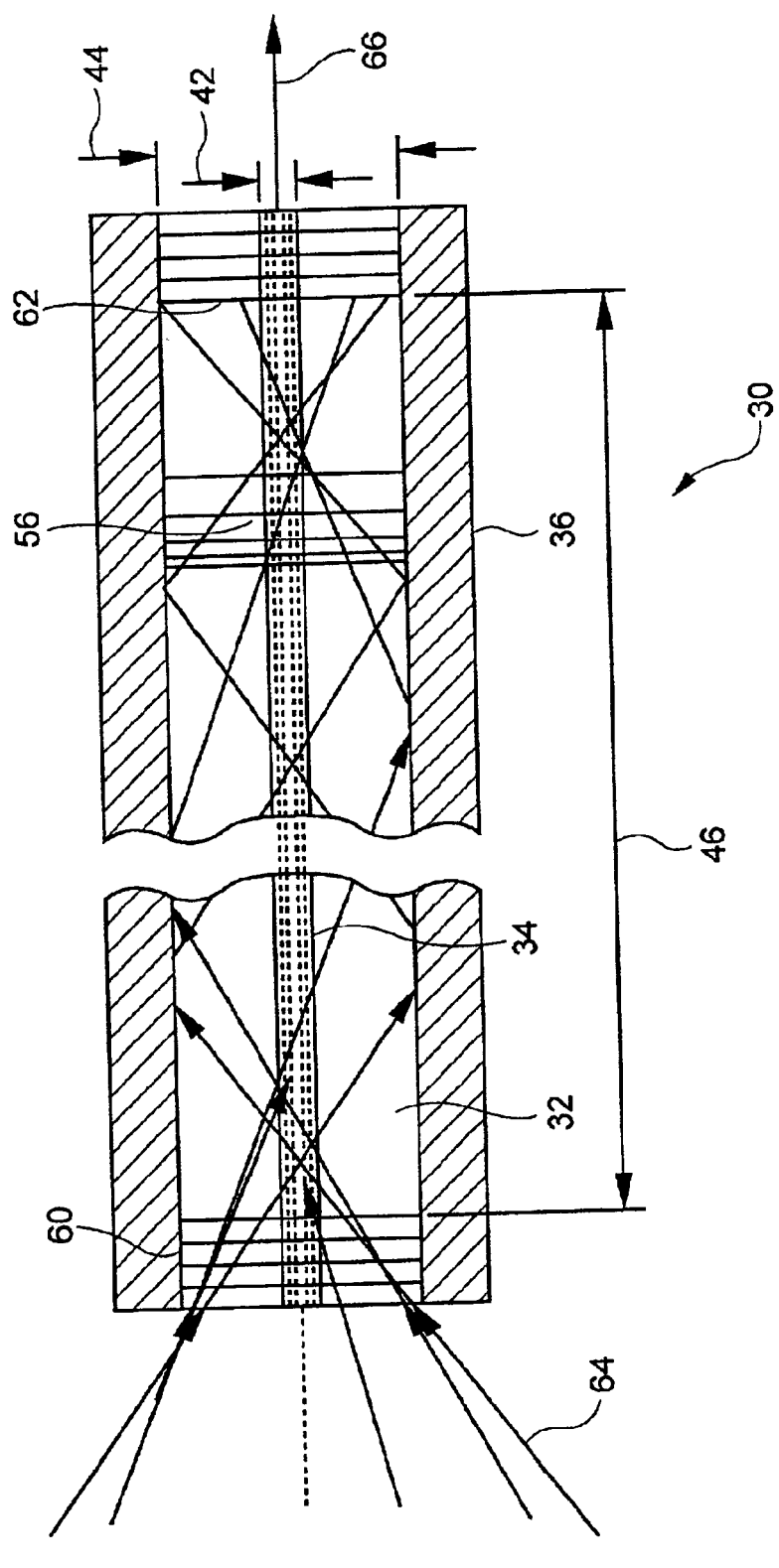
FIG. 5 is a cross-sectional illustration of using the active fiber 30 of FIG. 3, as one embodiment of a double-clad fiber, according to the present invention.
Figure 6:
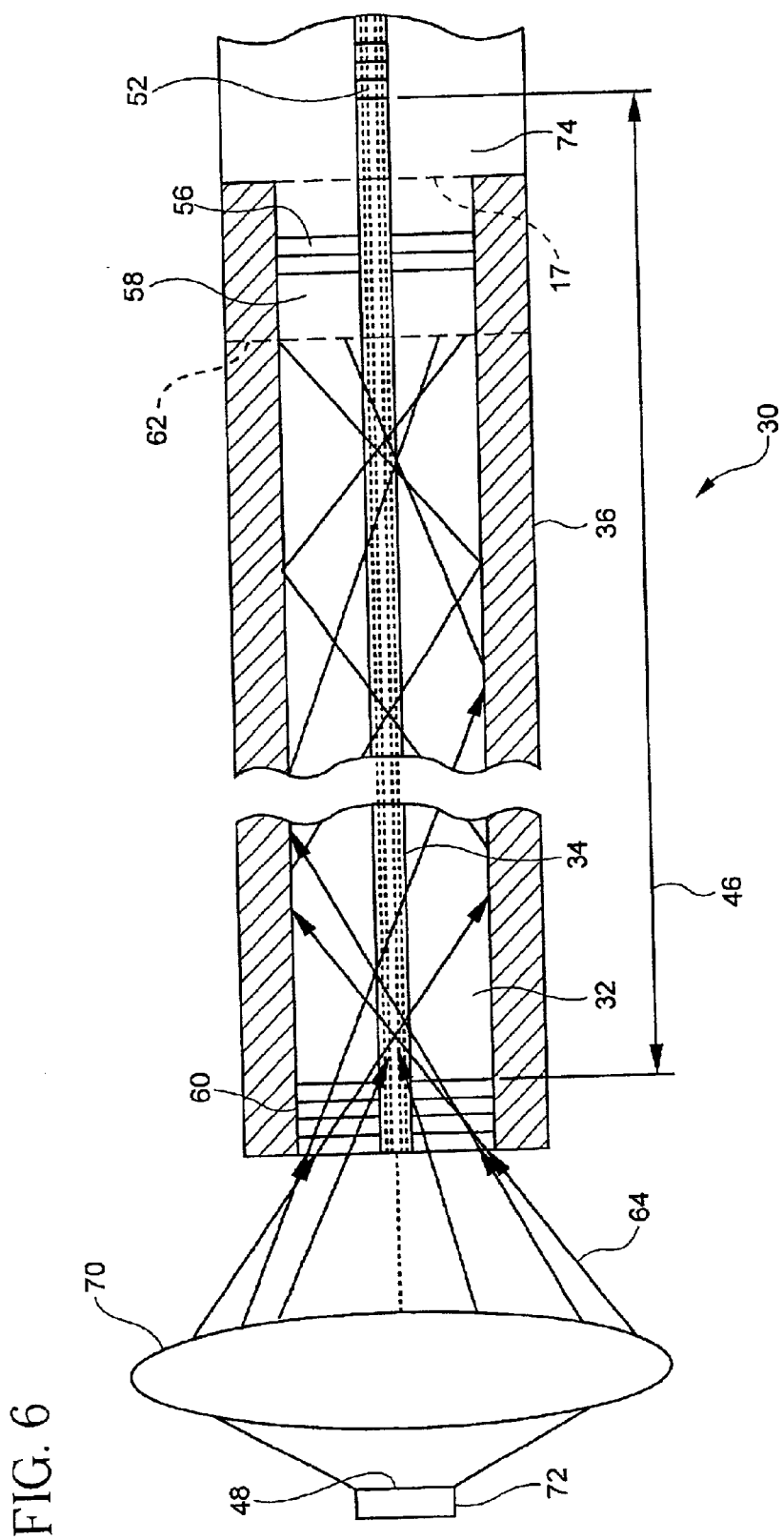
FIG. 6 is a cross-sectional illustration of using the active fiber 30 of FIG. 3, as a second embodiment of a double-clad fiber, according to the present invention.

Referring to FIGS. 3 and 5–6, various embodiments of the optically active waveguide 30 implemented as a double-clad fiber laser, either in a tubular fiber form or a planar dielectric waveguide form is shown. Generally, in a double-clad structure for a cladding pumped optically active waveguide laser 30, two claddings 32 and 36 are normally included. A first (inner) multimode clad 32 acts as a multimode-pumping core. The multimode portion 126, in this case, includes the multimode inner cladding fiber region 32 which is doped with a photosensitive dopant for facilitating the inscription of the fiber Bragg gratings. Preferably, photosensitive elements, such as Ge alone or co-doped and enhanced by P and/or B is used as the dopant for inscribing fiber Bragg gratings in the multimode inner cladding fiber region. The first cladding or clad 32 is adjacent to a single mode core 34, and a second clad 36 surrounds the first clad 32. Optionally, the core 34 may also be doped with the photosensitive dopant for writing the grating on the core also, as seen in FIGS. 3 and 5, but not in FIG. 6, as an example. For the single mode high reflector and output coupler, it may be sufficient to dope only the inner core region with a photosensitive dopant.

The preferred design and dimensions of the double-clad active fiber 30, allows strong pump absorption while suppressing long wavelength ASE and allows a strong enough pump intensity to obtain 3-level operation. A preferably-single-transverse-mode core 34, centrally located within the inner cladding 32, is made from glass having a sufficient compositional difference from the inner cladding 32 to provide the appropriate differences in refractive indexes. The core 34 does not have to be strictly single mode; a core on the border of being 2-moded still works. Preferably, the core 34 is doped with ytterbium ($Yb^{3+}$), erbium ($Er^{3+}$) or neodymium ($Nd^{3+}$) ions, but other rare-earth ions can be used. The double-clad active fiber 30 also includes an outer cladding 36 that is preferably made of a glass with a lower refractive index than the refractive index of the inner cladding 32 such that the $NA_{clad}$ is greater than 0.3. An all-glass design allows these types of refractive indexes and the glass types include lanthanum aluminosilicate glasses, antimony germanates, sulfides, lead bismuth gallates, etc. A preferred material for the overclad is also a glass, for example, an alkali of boroaluminosilicate.

For the ytterbium fiber laser provided by the active fiber 30, the signal wavelength $\lambda_S$ equals about 978 nm corresponding to the three-level $Yb^{3+}$ transition. Although the invention, where it concerns fiber lasers, is developed in view of $Yb^{3+}$ doping, it is not so limited. The fiber laser or brightness converter 30 may be doped with other transitional or rare earth ions, such as $Nd^{3+}$. A combination of $Yb^{3+}$ and $Nd^{3+}$ doping, either by co-doping or by a sequence of differently doped fibers allows pumping at 800 nm rather than 920 nm.

The first multimode clad or inner cladding serves as a waveguide with a high numerical aperture (NA) for the input pumping light. The cross-section of the first multimode clad ($D_{clad}$ is the longer dimension 44 of the inner cladding as seen in FIG. 5) may be designed to have a desired shape, e.g., matched to the near field shape of the pump source ($D_{laser}$ is the size of the broad-area laser light emitting aperture 48 in a slow axis as seen in FIG. 6) or any other configuration or shape which increases coupling efficiency of the pump beam. The numerical aperture ($NA_{clad}$) between the first and second clad layers must be large enough to capture the output of the pump laser diode. The actual increase in brightness realized depends on the clad to core ratio (CCR) of the pump cladding area to the core area, with the higher the ratio (CCR), the greater the brightness increase. However, this disparity in area between the core and cladding cross-sections necessitates a long device length, since the absorption of the pump radiation is inversely proportional to this ratio (CCR). Conventionally a high ratio (CCR) of pump cladding area to core area renders achieving a high level of inversion difficult which is important for three-level lasing, because in general the higher the ratio (CCR), the lower the level of inversion that can be achieved with a given pump power. Hence, pump absorption and inversion are related.

Using rare-earth ions which require a high level of inversion, such as Er, Yb or Nd as the dopant in the core of the double-clad fiber laser to provide gain with high clad to core ratio (CCR) is thus problematic. Even with the very high power available from a diode laser bar, it is very difficult to reach the high level of inversion necessary for the operation of a 3-level system for lasers.

The inversion problem stems from the relationship between the gains in the two competing transitions and the pump absorption for Yb. As a representative example, the gains at the two wavelengths in a Yb-doped germano-alumino-silicate glass (assuming homogeneous broadening) are related by the equation:

$$G_{1030} = 0.25 G_{976} + 0.74 \alpha_P \frac{\Gamma_S}{\Gamma_P} \qquad (2)$$

where $G_{1030}$ and $G_{976}$ are the gains at 1030 nm and 976 nm, respectively, $\alpha_P$ is the partially-bleached pump absorption in decibels (dB), and $\Gamma_S$ and $\Gamma_P$ are the respective overlap factors of the signal mode and pump mode with the dopant profile.

Similar relationships with different coefficients will hold for other hosts, such as antimony silicate glass. However, in the specific case of an Yb 3-level transition at 980 nm, Equation (2) can be used to estimate the desired overlap ratio of $\Gamma_S$ and $\Gamma_P$ which is closely related to the area ratio (CCR) of the inner cladding area over the core area ($A_{clad}/A_{core}$). For Yb, given that an absorption of at least 6 dB of pump is desired, and the inability to suppress more than forty extra dB of gain at the competing quasi-four-level transition at 1030 nm, then using Equation (2), the desired $A_{clad}/A_{core}$ can be calculated. For the preferred silicate host glass the desired clad-to-core ratio ($A_{clad}/A_{core}$) is thus found to be less than eight for a Yb double-clad fiber laser.

Referring to FIGS. 5–6, a lasing waveguide 30, such as an optically active fiber or a planar waveguide, for making the fiber laser 18 of FIG. 1 is illustrated. This optimized double-clad structured active fiber 30 has a doped central part or core 34, doped with an optically excitable ion having a three-level transition or any other type of ion requiring a high level of inversion. The core 34 has a core refractive index ($n_{core}$) and a core cross-sectional area. The cross-sectional area can be calculated from the dimensions 42 of the core. An inner cladding 32 surrounds the core 34. The inner cladding 32 has an inner cladding refractive index ($n_{innerclad}$), less than the core refractive index by about 0.1, an inner cladding cross-sectional area between 2 and 25 times greater than that of the core cross-sectional area (2<CCR<25), and an aspect ratio greater than 1.5:1. The outer cladding 36 surrounds the inner cladding 32 and has an outer cladding refractive index less than the inner cladding refractive index of about 0.14 as the index delta for Al—La—Si-based fibers, as an example. This preferred design and dimensions of the double-clad active fiber 30, allows strong pump absorption, greater than 6 dB, while suppressing long wavelength ASE. The inner cladding cross-sectional area can be calculated from the dimensions of the inner cladding, which includes a longer dimension 44 that can be exemplified by the longer dimensions of a rectangular inner cladding or of an elliptical inner cladding.

Neglecting waveguide loss, $g_{976}$=7 dB. It is desired to absorb at least 6 dB of pump power, but not more than 40 dB of 1040 nm gain can be suppressed by wavelength selective feedback. After substituting these values into Equation (2), the preferred clad-to-core area ratio or overlap ratio of $\Gamma_S/\Gamma_P$ can be found, and a maximum ratio of 7.6 is found for the rare-earth dopant Yb for use in an Yb fiber laser at 980 nm.

For all rare-earth dopants as the optically excitable ions, such as Er, Nd, Tm, and Yb to provide the active medium, especially those requiring a high level of inversion, a maximum allowable inner cladding area exists for the double-clad structure.

In general, it is not the clad-to-core ratio (CCR), but the absolute size of the inner cladding in a double-clad structure or of the multimode core in a tapered fiber laser that is most critical for efficient laser operation.

Accordingly, in the double-clad structure, the core 34 can be any size that fits inside the inner cladding 32 of FIGS. 3, 5 and 6. However, it is preferable that the core 34 is similar in size and NA to standard single-mode fibers, such as the output fiber 20 of FIG. 1 and a single-mode portion 74 of FIG. 6 for coupling to the output fiber 20. With the typical single-mode core radius of 3 to 4 um, a clad-to-core area ratio CCR ($A_{clad}/A_{core}$) of 10:1 to 20:1 is possible. Using a typical core radius of a=3 $\mu$m, the clad-to-core area ratio CCR is $A_{clad}/A_{core}$=500/($\pi \cdot 3^2$)≈18, which is well below values recommended in prior references or ever reported for working double-clad lasers.

Preferably, the cross-sectional area of the inner cladding should not exceed 500 $\mu m^2$. If the available power is doubled in the laser diode as in a 4 W pump diode, recommended values are then also doubled such that the clad-to-core area ratio range is now 20:1 to 40:1 and the inner cladding area is now less than 1000 $\mu m^2$.

What is important for 3-level devices, such as these rare-earth-doped fiber lasers, is the level of pump power density that can be created in the inner cladding, which defines the achievable inversion. To find the maximum desired area of the inner cladding, it is more convenient to use the power threshold estimate equation for a laser. For any 3-level device the threshold pump power $P_{th}$ in a laser always has to be higher than the saturation power $P_{sat}$. In other words the fiber laser must be "bleached" (i.e., where approximately one-half lasing atoms have been excited into an excited state) along a substantial part of its length. $P_{sat}$ is the saturation power defined as $$P_{sat} = \frac{hv}{\sigma_{ap}\tau} A_{clad} \qquad (3)$$

Hence, the smaller the inner cladding area ($A_{clad}$) the lower is the saturation power $P_{sat}$ because these two terms are directly related by Equation (3). The smaller the saturation power is, the greater the inversion because these terms are inversely related, hence the higher inversion can be achieved to make a 3-level laser work.

The threshold power $P_t$ scales in proportion to the cladding area ($A_{clad}$) and the length of the laser. The threshold pump power is well approximated by the following equation where it can be seen that the threshold pump power is higher than the saturation power by a factor $\alpha_P/4.343$ when the fiber laser is bleached:

$$P_{th} = P_{sat}(\alpha_p/4.343) = \frac{hv A_{clad}}{\sigma_{ap}\tau}(\alpha_p/4.343) \qquad (4)$$

where $\sigma_a$ is the pump absorption cross section, $\tau$ is the fluorescent or metastable level lifetime, $A_{clad}$ is the cross-sectional area of the inner cladding, and $\alpha_P$ is the pump absorption in dB. Hence, from Equation (4), the power threshold for lasing depends essentially on the dimensions of the inner cladding and the background loss in the active fiber over the pump absorption length.

Referring to FIG. 6, if the Yb fiber laser provided by the active fiber 30 is pumped with a single 2 W broad-area laser diode 72 and the input pump power $P_{in}$=1600 mW is actually launched in the inner cladding 32, for the efficient laser operation the threshold power required for lasing should not exceed about a quarter of the input pump power, or 400 mW. Taking $\alpha_p$=6 dB, hv=2.16×10$^{-19}$ J (for a 920 nm pump), $\sigma_{ap}$=8.3×10$^{-21}$ m$^2$, $\tau$=0.8 ms and $P_{th}$=0.4W, the cladding area is preferably $A_{clad}$=890 $\mu$m$^2$ from Equation (4). Hence, for a Yb doped 976 nm double clad fiber laser pumped with a 920 nm broad-area laser diode, the recommended values for clad-to-core area ratio are 2:1 to 8:1 from Equation (2) and the cross-sectional area of the inner cladding should not exceed 900 $\mu$m$^2$ from Equation (4) because the threshold should be decreased as much as possible.

A double-clad fiber with such a small clad-to-core area ratio is realizable. For an 8 $\mu$m diameter circular core within a preferred 10×30 $\mu$m elliptical multimode inner cladding, the area ratio is equal to (5·15/42)≈4.7 which is less then the maximum taught ratio of 8 for Yb.

However, the practical size of the minimum area of the inner cladding will be limited by the choice of materials ($NA_{clad}$ and the index contrast or index delta) and the quality of pump focusing optics. With a cladding aspect ratio of 2 or higher it would be impossible to have a cladding to core area ratio CCR of less than 2, unless the core is elliptical too. Furthermore, with conventional optics it is very difficult to focus a 100 um broad area laser into a spot smaller than 20 um in size, and it is not practical to make a single-mode core larger than 10 um because the required index contrast or index delta will be too low. This, again, dictates that the minimum CCR is about two.

In a double-clad laser with a small clad-to-core area ratio (CCR), cladding modes of the signal will overlap with the doped core to a sufficient degree to experience gain in the higher-order modes (HOM). Any mode of the waveguide has a certain profile of the optical field. It is only amplified as much as that field overlaps with the doped region. Most of the field of the fundamental core mode is within the core 34, and that mode would obviously be amplified, if the required level of inversion were achieved. However, the inner cladding supports many different modes because of its larger size. Some ions will always transition spontaneously, giving equal amount of photons to every mode, core and cladding. If the cladding is comparable in size to the core, at least some of the higher-order inner cladding signal modes will have a sufficient overlap of their field with ions in the core to also be amplified. This will degrade the laser efficiency, because optical energy accumulated in the higher-order cladding modes (ASE) will not be coupled to a single-mode output fiber.

One solution for the laser, is to use mode-selective feedback to ensure a fundamental mode-only laser operation. If sufficient length is provided, the double-clad fiber itself can be used as the fiber laser with the output coupler 62 written on the inner cladding of the double-clad fiber near its output end, as in FIGS. 3 and 5. However, if more length is needed or better mode-matching with a single-mode fiber is desired, the output coupler 62 can be instead written as the cavity-end mirror 52 on the single-mode core of a single-mode fiber 74, as seen in FIG. 6. A mode-matched coupling 17, as in FIG. 6, will now be in the form of a splice, a downstream pigtail or a taper to couple with the single-mode fiber 74 containing the output coupler grating 52 as the output end of the extended optical cavity. This grated single-mode fiber 74 thus provides an intra-cavity transverse-mode-selective element that is coupled to the output end of the optically active fiber for selecting the lowest transverse lasing mode. Hence, to provide mode-selective feedback, as seen in FIG. 6, the output single-mode fiber 74 is mode-matched to the double-clad fiber core mode and the signal reflector, output coupler, or the signal mirror 52, in the form of a single mode Bragg grating is provided in the single mode output fiber 74, to ensure stronger optical feedback for only the core mode. If the internal loss is sufficiently small within the single-mode portion 74, then the laser efficiency is relatively insensitive to the external reflection in the single mode portion 74 outside of the mirror 52. Therefore, a 4–15% external reflector 52 will not significantly decrease the efficiency.

Alternatively, the reflector or output mirror 52 can be placed in the single-mode output fiber 20 itself, without the intervening single mode fiber section 74. Even its 4% reflectance of the single mode grating 52 across an air gap to a butt coupled output fiber 20 of FIG. 1 is sufficient to define the optical cavity. The single mode fiber 20 is butt coupled to the output end of the core 34.

Once the fibers are mode-matched, only one mode, the fundamental mode of the lasing signal 66 in the core mode of the double-clad fiber laser 30, will receive the feedback, and the cladding modes will not. Hence, the reflector or mirror 52 reflects the signal light to perform a mode selection function. The presence of the reflector 52 and mode matching will ensure that cladding modes never lase.

Preferably, the mode field diameters (MFD) for the respective lowest-order modes are thus matched across the junction between the output end of the active fiber 30 and the single-mode fiber 20 or 74. If not index-graded, the core is sized sufficiently small such that the core supports only one transverse mode at the output signal wavelength such that this single transverse mode has a mode field diameter equal to that of a standard single mode fiber for optimum coupling.

As an example, a 30×10 micron (or $\mu$m) rectangular inner cladding 32 of a multi-component silicate glass is placed within an outer cladding 36 having a diameter of 125 micron and has a core 34 having a core diameter 42 of 6 micron, to provide an output mode closely matched to a CS980 singlemode fiber 20. Preferably an antimony silicate glass is used. Another multi-component silicate glass is 60SiO$_2$ 28Al$_2$O$_3$ 12La$_2$O$_3$ (in mole %). Even though other single-mode fibers are usable, the single-mode fiber 20 is preferably, the CS980 single-mode fiber made by Corning, Inc. for propagating wavelengths at 980 nm and having a standard 125 micron outer diameter.

Minimizing the mismatch of the coefficient of the temperature expansion (CTE) is very important for increasing fiber reliability and to facilitate the cleaving and end polishing of the fibers. A less than +/−30×10$^{-7}$/° C. over the range 0–200° C. CTE mismatch is preferred between the inner cladding and outer cladding. The most important point of mismatch is between the inner and the outer clad, though the core to clad CTE mismatch could be important for polishing. Hence, the core is preferably also made from a glass having a coefficient of thermal expansion (CTE) mismatch with the material of the inner cladding of less than +/−30×10$^{-7}$/° C. over the range 0–200° C. These requirements are relatively easily met using antimony silicates, alumino-lanthano-silicates, alumino-phospho-germanosilicates and a variety of other oxide glasses. For some fiber-making techniques, such as triple-crucible draw, it is also important to match the viscosities of the core, inner and outer cladding glasses for better control over a waveguide shape.

Since the present invention teaches that a high inversion level should be maintained throughout the whole length of a 3-level laser, a significant amount of pump power would pass through and escape on the other end. Therefore, for maximizing the laser efficiency, it would be preferable to use the pump reflector 56 to reflect the residual power back into the device.

Even a very small amount of signal reflection can cause undesirable multi-path interference effects. Hence, the pump reflector 56 would preferentially be written in the host cavity fiber, inside the doped lasing waveguide of FIG. 5 near the fiber end, but could also be placed outside the lasing waveguide and/or be written in a different fiber which is spliced to the lasing fiber. Thus, the multimode grating 56, optionally displaced by a small distance from the fiber end within the non-doped double-clad section 58 in FIGS. 3 and 6, acting as a pump reflector, could also provide some mode-selective feedback for the signal, if it is designed to reflect 100% at the pump wavelength and 5–15% at the signal wavelength, or for other reflection spectra, such that it is transparent for the signal and highly reflective for the pump. Mode-matched coupling (splicing) 17 the fiber Bragg grating (FBG), in the non-actively doped double-clad portion 58 for the double-clad structure (or a non-actively-doped multimode portion 58 in a tapered fiber laser structure in FIG. 4), acting as the pump reflector 56, to the single mode fiber 20 of FIG. 1 directly, or to an intervening single mode section 74, can provide mode-selective feedback by maximally reflecting power at most of the spatial modes of the wavelengths of the pump bandwidth propagated in the multimode inner cladding portion of the double-clad or the multimode core of the tapered fiber laser for enhancing the power output of the laser.

In general, a multimode fiber Bragg grating (MM-FBG) used thus as a pump reflector 56, re-uses the residual pump power which is not absorbed at the end of the multimode or double-clad Yb-doped region. For the pump reflector, as many modes as possible should be reflected at the pump wavelength, e.g., in the 920-nm band. The pump reflector should reflect as many modes as possible in the high NA multimode fiber but should not reflect the laser line at 980 nm. These pump modes may either be self-reflected, or may be coupled into other backward propagating modes; either reflection will aid in re-using the pump. Typically all higher order modes reflect at shorter wavelengths, since $n_{eff}$ is lower for each higher order mode.

Figure 7:
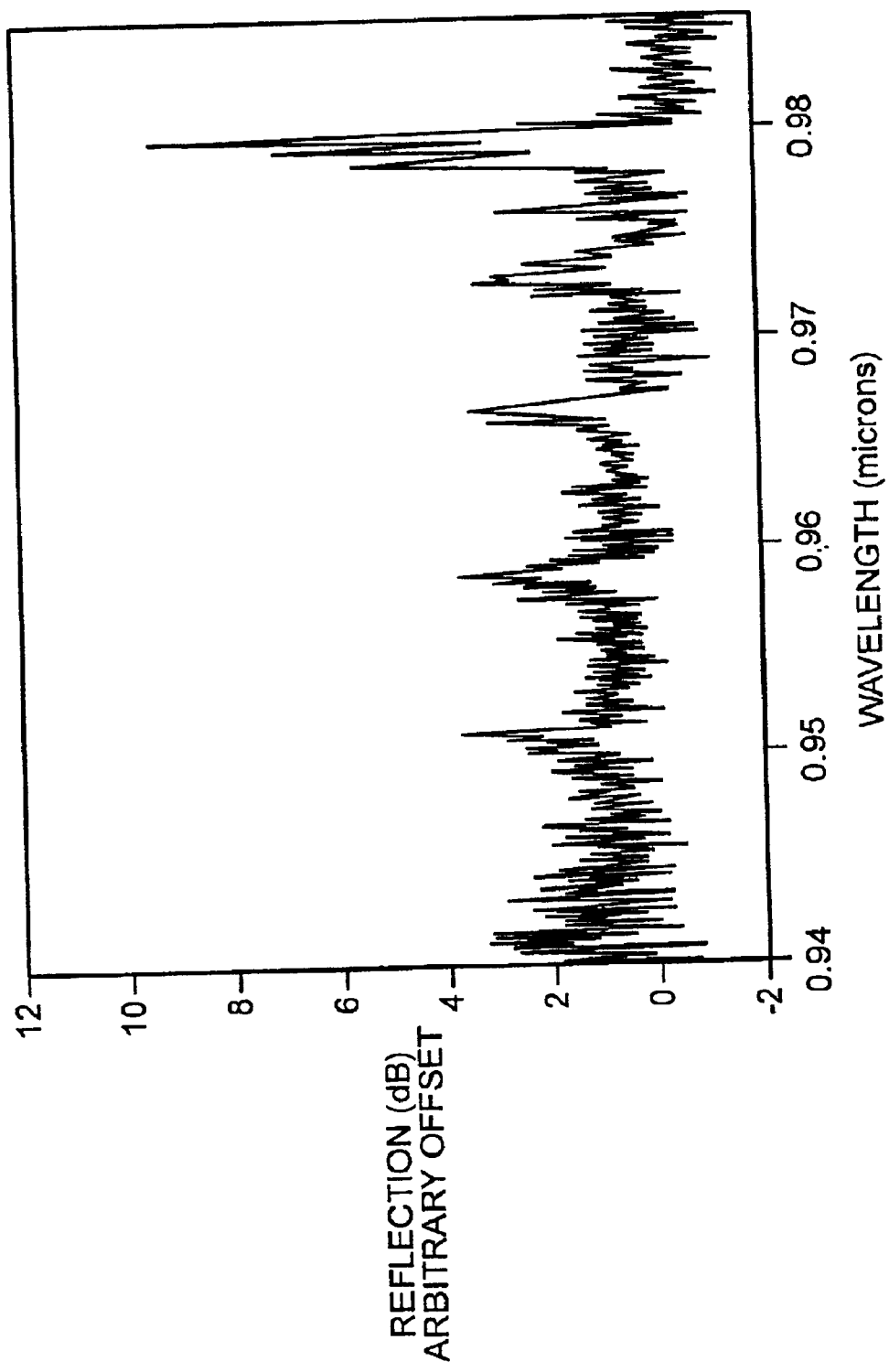
FIG. 7 is a graph of the reflection spectrum of a multimode input mirror grating, according to the present invention.

Referring to FIG. 7, the reflection spectrum of a uniform fiber Bragg multimode grating shows that the Bragg condition is met for higher order modes at successively shorter wavelengths. To reflect the higher order modes, it is thus desirable to increase the grating period, using a chirped FBG. Chirp refers to a variation in frequency or periodicity along the grating.

Figure 8:
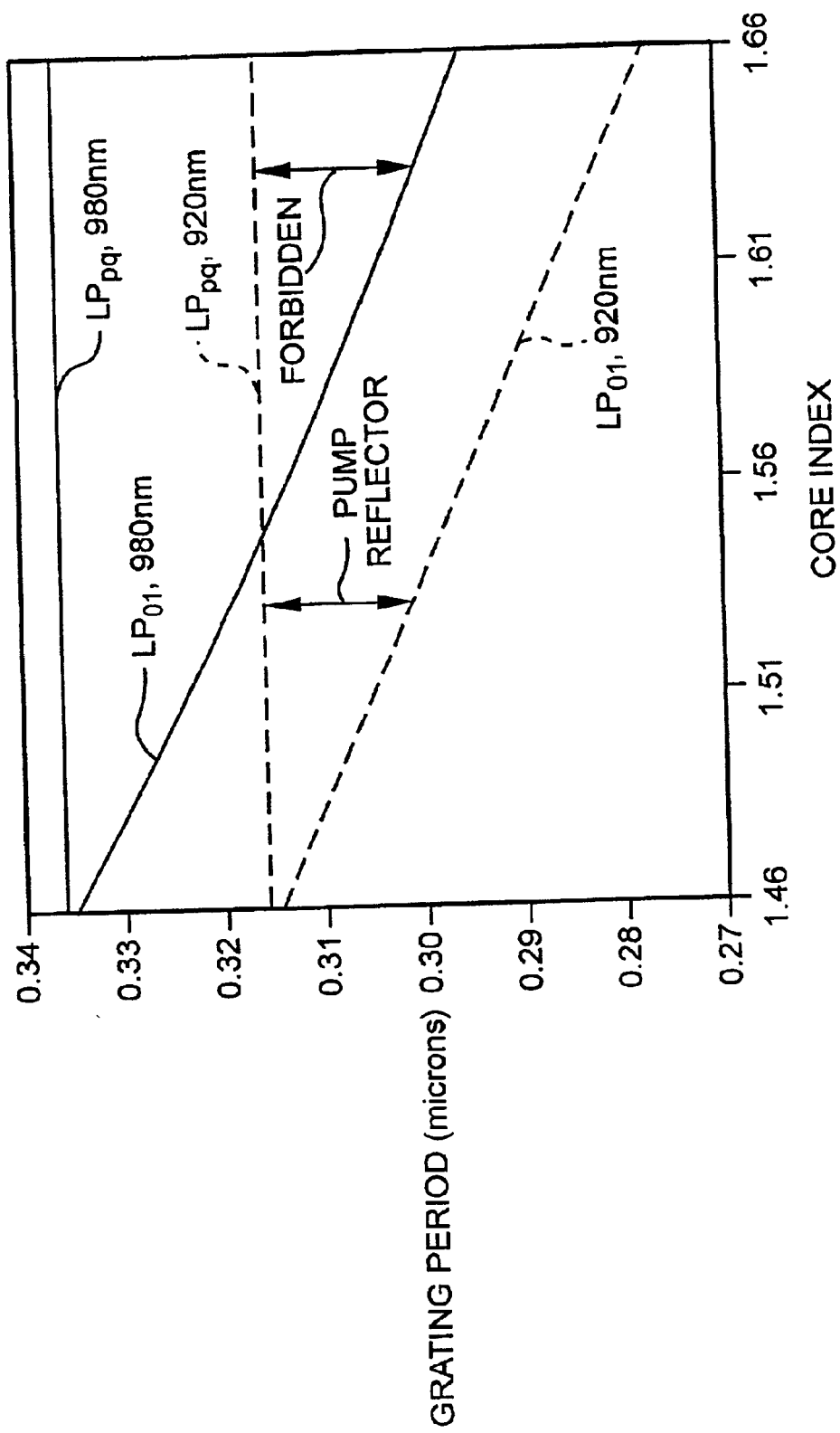
FIG. 8 is a graph of the grating period parameter space for a chirped multimode pump reflector, according to the present invention.

As an example of the pump wavelength bandwidth 64, a target pump window from 915 nm to 925 nm is assumed to allow for pump wavelength shifts with increased diode drive current. Reflection of the fundamental mode at 925 nm requires a grating period of $\Lambda_{min}$=302 nm in a fiber with $n_{core}$=1.53. Reflection of the highest order mode at 915 nm ($n_{eff}$~1.456) requires a grating period $\Lambda_{max}$=314 nm. A MM FBG with 12 nm of chirp would therefore effectively reflect all pump modes. The lasing mode at 978 nm is not affected by the pump reflector 56 because the grating period is less than 320 nm which is the grating period for reflecting the lasing wavelength. Referring to FIG. 8, the allowed parameter space for a chirped FBG design as a function of core index is shown. The dashed lines represent the lowest order and highest order modes for a pump at 920 nm. The solid lines indicate these modes for the desired 980 nm laser line. The ideal pump reflector spans the range of FBG periods between the dashed lines, but does not exceed the $LP_{01}$ 980 nm boundary. There is a limitation about not reflecting signal modes due to the small wavelength separation between the pump (915–925 nm) and signal bands (976–980 nm). Gratings in high index fibers run into design limitations associated with a high core index. There is a limit to the allowed chirp on a pump reflector if the index is too high, because it is desirable to avoid reflecting the fundamental mode at wavelengths near the desired lasing signal.

For pump and signal wavelengths at 920 nm and 980 nm, respectively, and assuming a silica cladding, this limitation is at around n=1.55 as shown in FIG. 8. Reflection of the 980-nm fundamental mode thus becomes an issue when the core index exceeds 1.55. This core index limitation will change depending on fiber geometry, cladding material, and the exact wavelengths in question.

In practice, the maximum grating period can be shorter than that indicated by the highest order mode at 920 nm (upper dashed line, FIG. 8). Since most of the pump power is carried in the lower order modes, reflection of the first 30 to 50 modes is expected to be sufficient for pump reflection; the upper bound on the grating period $\Lambda$ is then determined by the effective index $n_{eff}$ of the 30$^{th}$ or 50$^{th}$ mode, rather than by the cladding index $n_{clad}$.

Reducing the grating period provides some design room for both high NA fibers and for host fibers with low photosensitivity. Low photosensitivity implies low chirp rates and/or long interaction lengths to achieve high reflection coefficients. The exact chirp rate and grating length would be determined by the photosensitivity of the chosen multi-component silica fiber and the allowed extent of the grating inside the laser cavity.

The index (n) of the fiber is fixed by the fiber and cavity design, e.g., by variables such as what the required NA is. FIG. 8 shows how to choose the grating period, or the acceptable range of chirp, in a fiber with $n_{clad}$=1.456, and $n_{core}$=a value on the x-axis.

The grating bandwidth of the pump reflector should be as large as the pump bandwidth in as many modes as possible of the pump. The effect of this is that the grating bandwidth is larger than the pump bandwidth, when looking at all the modes reflected. For example, if the fundamental mode at 915 nm is reflected, then higher order modes are automatically reflected at shorter wavelengths, i.e. 910 nm. Likewise, to reflect the highest order modes at 925 nm, lower order modes at longer wavelengths would be reflected, i.e. 930 nm. See, for example, FIG. 9 where the demonstrated MMFBG has a bandwidth>12 nm. The bandwidth of the pump reflector would be designed based on the bandwidth of the pump, the index of the fiber (according to FIG. 8) and other parameters.

Hence, to choose the grating period or chirp of a pump reflector, the present invention teaches that the multimode pump reflector should have a grating period between a minimum grating period associated with the fundamental mode of the pump wavelength and a maximum grating period that is the lesser grating period associated with one of the fundamental mode of the signal wavelength or of the highest mode of the pump wavelength. Referring to FIG. 8 for this rule implementation, select the fiber core index on the x-axis and find the y-value corresponding to the line $LP_{01}$, 920 nm. This gives the lower limit on the grating period. Using that same x-value, find the y-value which corresponds to the lesser of $LP_{01}$, 980 nm (if $n_{core}$>1.55), or $LP_{pq}$, 920 nm ($n_{core}$<1.55). This gives the upper limit for the grating period. This corresponds to selecting the pump reflector in the region shown by the double-ended arrow labeled "pump reflector", and keeping it out of the region labeled "forbidden region". If the well-known phase mask writing technique is used, the phase mask period is found by doubling the grating period.

The input mirror 60 in the multimode fiber can also be designed for optimum mode discrimination in double clad fibers. In a double clad fiber laser, both the fundamental and some lower order modes with very similar effective indices can experience significant gain, as discussed in relationship with the output mirror 52 of FIG. 6.

The fiber laser preferably has an unchirped (or very slowly chirped) MM input mirror grating 60 with the fundamental mode matched to the desired narrow band lasing signal wavelength. To avoid unwanted reflections at other wavelengths with potential gain, the bandwidth is limited by the design rule associated with a high core index. For example, in a 32 μm×16 μm elliptical double-clad fiber with a 10 μm inner core (diameter), an outer cladding of index $n_{clad,2}$=1.46, and an inner cladding of index $n_{clad,1}$= 1.62, the following effective indices are calculated for low order modes:

|  | Case 1 ($n_{core}$ = 1.622) | Case 2 ($n_{core}$ = 1.624) |
| --- | --- | --- |
| $n_{eff,0}$ | 1.62105 | 1.62290 |
| $n_{eff,1}$ | 1.61978 | 1.62130 |
| $n_{eff,2}$ | 1.61807 | 1.61918 |

If the grating has a period of 0.3015 μm, the Bragg wavelength for modes 0, 1, 2 of Case 1 are 977.5 nm, 976.7 nm and 975.6 nm. Hence, if the grating bandwidth is ignored, higher order modes will be reflected and probably lase along with the fundamental, with Bragg wavelengths falling within the laser bandwidth (of about 2 nm). Restricting the grating bandwidth to less than 0.5 nm, however, would selectively reflect only the fundamental and favorably increase differential modal loss.

Figure 15:
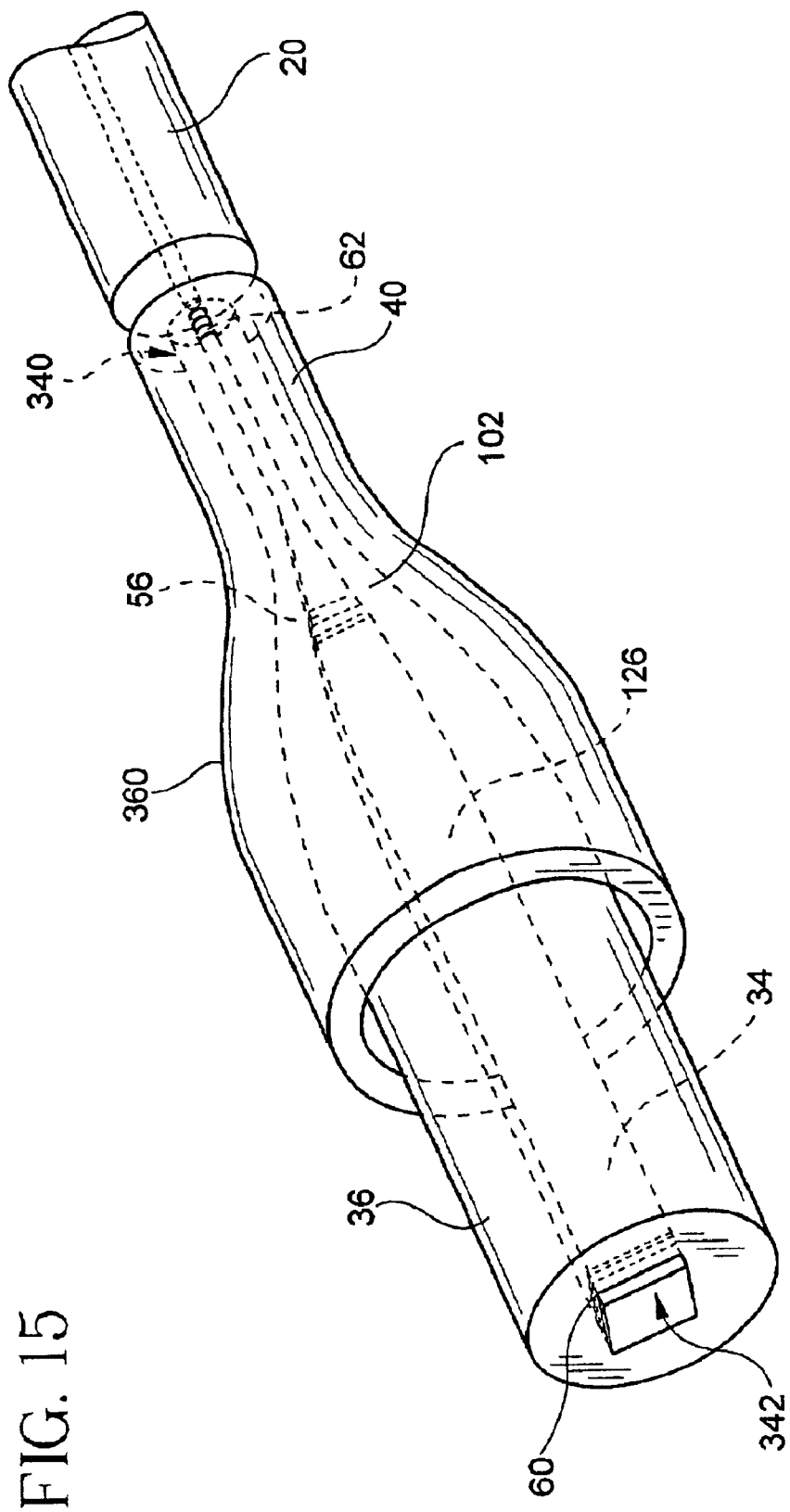
FIG. 15 is a perspective illustration of using the active fiber 30 of FIG. 2, as a tapered embodiment of a fiber laser, according to the present invention.

To choose the grating period or bandwidth of a signal reflector or mirror, select the fiber core index on the x-axis and find the y-value which corresponds to $LP_{01}$, 980 nm. The target here is a single mode signal reflector, so it is preferably not chirped, however a chirped input mirror 60 (as seen in FIG. 15) or a chirped output mirror (not shown) is also possible. The grating bandwidth here is determined approximately by the following equation:

$$\Delta\lambda/\lambda_j < \Delta n_j/n_j.$$ (Eq. 5)

In this simplified condition for maximizing differential modal loss, the left-hand term is the grating bandwidth divided by the Bragg wavelength of the $j^{th}$ mode, and the right-hand term is the effective refractive index difference between the $0^{th}$-order mode and the $j^{th}$ order mode divided by the latter-mode effective refractive index.

For example, from equation 5, if $n_{eff,0}$=1.62105, then to design a 980 nm reflector, Λ=0.980/(2*1.62105)=0.3023 μm. The next mode occurs at $n_{eff,1}$=1.61978, or at 979.23 nm, so the grating bandwidth should be less than 980.0– 979.23=0.77 nm. This could be made with a uniformly periodic FBG anywhere from about 340 μm (0.77 nm bandwidth) to 520 μm (0.5 nm bandwidth) long, or with other well-known designs such as a Gaussian apodized grating.

Gratings in high index fibers also require special phase masks, typically with much lower periodicity than standard phase masks, because the Bragg condition has to be satisfied to accommodate the effective index being a lot higher. These lower periodicity masks are commercially available, but at higher cost because they require customization.

Several methods may be used to achieve chirped multimode FBGs. The simplest is to use a specially designed chirped phase mask. The FBG exposure process is then identical to that of a uniform FBG. Beam manipulation approaches using a diverging (or converging) beam and a uniform phase mask may also be used, but do not provide as wide of a chirp range. As the beam spreads (converges) behind the phase mask, the grating period shifts slightly and a chirped FBG may be written, either by writing regions of the FBG sequentially, translating the fiber to a new section and to a different distance from the phase mask with each exposure, or by tilting the fiber with respect to the plane of the phase mask.

Figure 12:
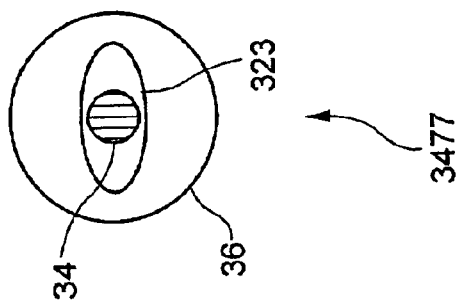
FIG. 12 is a cross-sectional representation of an ellipsoid or elliptical shape 323 of the inner cladding 32 of the active fiber 30 of FIG. 3, according to the present invention.
Figure 11:
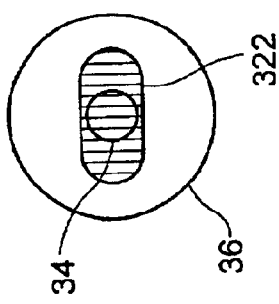
FIG. 11 is a cross-sectional representation of a racetrack shape 322 of the inner cladding 32 of the active fiber 30 of FIG. 3, according to the present invention.
Figure 13:
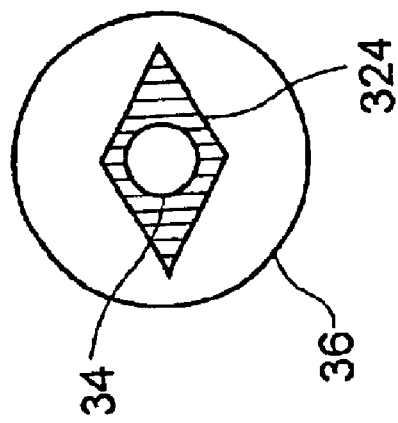
FIG. 13 is a cross-sectional representation of a diamond shape 324 of the inner cladding 32 of the active fiber 30 of FIG. 3, according to the present invention.

For example, a chirped pump reflector 56 was UV-written in a Ge-doped elliptical inner cladding and the surrounded core of a double-clad Yb-doped OVD powder-doped multicomponent silica fiber, cross-sectioned in FIG. 12. The grating was written at 244 nm using a 10× beam expander and a 630 nm±8 nm/cm phase mask. Transmission depth was monitored on an ANDO optical power meter during ten minutes of exposure time. Throughput power from the 920 nm diode biased at 500 mA current decreased by 1.76 dB during exposure, so reflectivity (R) is approximately 33%. This is in agreement with the peak reflection (+9.63 dB) measured relative to a flat cleaved reference level, which also predicts 33% reflection. Within other optical design constraints, an optimized MM-FBG pump reflector would have a stronger reflection coefficient.

Figure 9:
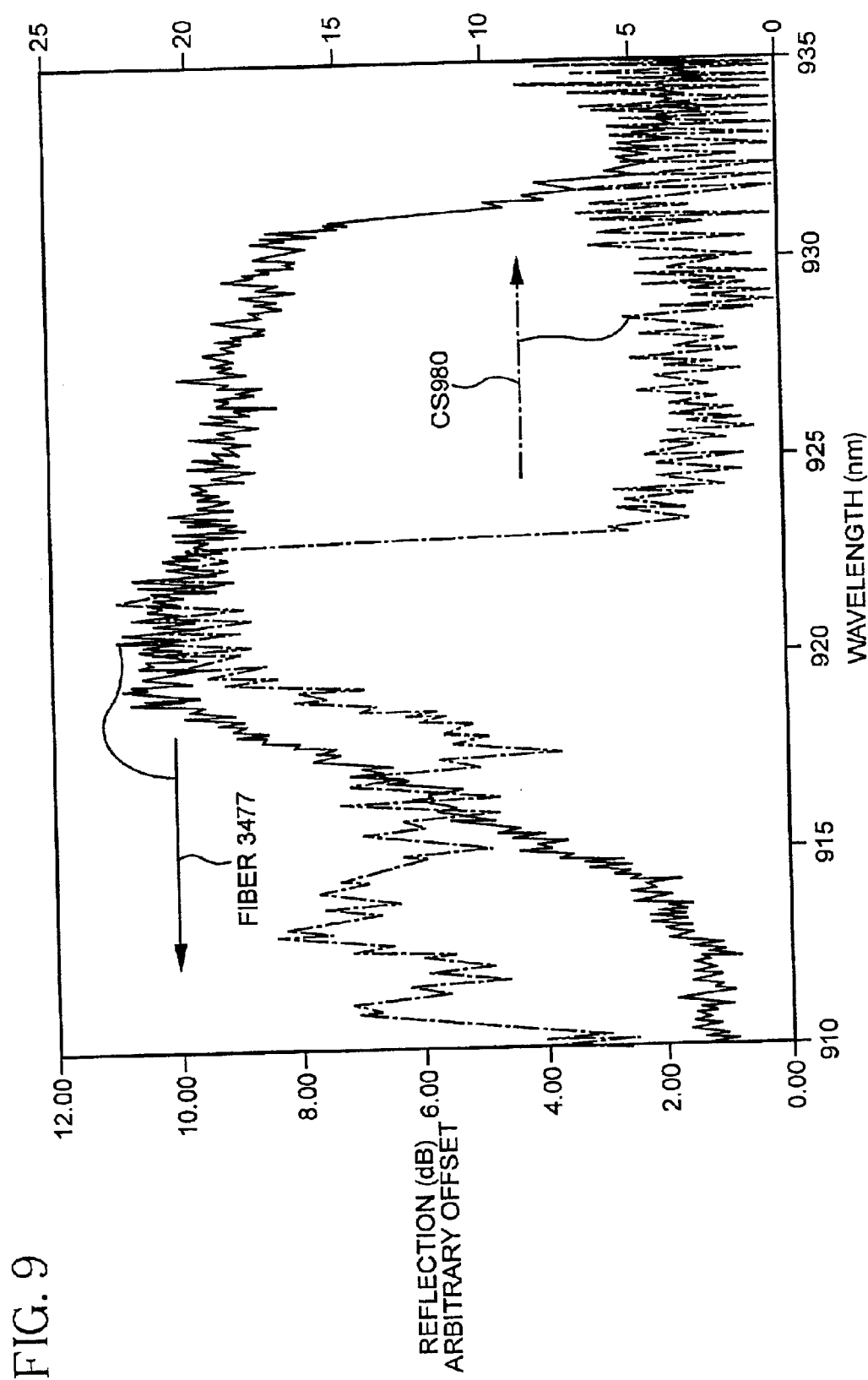
FIG. 9 is a graph of the reflection spectrum of a chirped multimode pump reflector designed according to the graph of FIG. 8, according to the present invention.

The reflection spectrum from this MM-FBG pump reflector 56 is shown in FIG. 9 (solid line, left axis for fiber sample 3477). Also shown for comparison is a single mode grating in the single mode fiber trademarked Corning® CS-980 which was written with the same UV beam (dashed line, right axis, arbitrary reference level). The multimode grating in the multimode fiber is designed to be 12.55 nm wide ($\Delta\lambda_{3dB}$), because there are more modes in the multimode fiber which meet the Bragg condition, whereas the primary peak in the single-mode CS980 fiber is only 3.6 nm wide. A weaker wide spectrum is also visible in the single-mode CS980 fiber since the grating wavelength is below cutoff. The larger number of modes reflected for each of the shorter wavelengths accounts for the increased power enhanced by the multimode pump reflector 56. This chirped MM-FBG demonstrates that a chirped pump reflector is feasible for fiber laser applications, provided that sufficient photosensitivity is available in the host fiber.

Whether in a double-clad or tapered fiber laser, gratings in a non-circular portion of the multimode fibers present a challenge for monitoring and measurement. Splice losses to standard fibers are typically high, especially with a rectangular inner cladding of a double-clad fiber or the rectangular core of a taper fiber laser, so this further reduces the detected signal. A multimode 50/125 um graded index fiber was used as the launch fiber for transmitting light to the grating, and a MM fiber coupler was used for monitoring the reflection of the grating. In actively-doped non-circular portions of the fiber lasers, splice loss is compounded by absorption. Both doped and undoped (dummy) fiber portions can be used as the multimode medium to apply the grating on. Higher fiber loss via scattering, and/or any modal coupling along the fiber outside of the grating region also compound measurement errors. Scattering loss would normally be reduced in an actual fiber laser that is appropriately designed. The scattering loss impact is minimized by writing the grating very close to the input splice, to reduce propagation lengths in the non-circular fiber sections. In several experimental cases, grating growth was monitored in reflection only, since transmission losses were prohibitively high. Monitoring in transmission is also difficult in that power which is not in the reflected mode at each wavelength still reaches the detector. Writing and monitoring techniques such as those based on the fiber laser measurements which are affected by the grating performance could be used for writing in doped MM fiber during actual fiber laser manufacture.

Optionally, rotational alignment before or during writing in the non-circular fiber sections could be done to ensure exposure along one axis or the other of a rectangular core or inner-clad fiber sections, if excessive differences in grating writing efficiency was attributed to sensitivity to orientation.

The optimized grating depends on the other design parameters of the fiber laser and vice-a-versa. In general, maximizing the overlap between pumping light and actively-doped fiber core is advantageous. Thus it is desirable to make the core larger and inner cladding smaller. A larger core improves pump absorption and a smaller inner cladding helps create higher inversion with less pump power. However, other factors already discussed and to be seen, limit the optimum core size to the one corresponding to a nearly two-moded core. The example easiest to follow is one using the Yb fiber laser at 980 nm. Due to physics, an area ratio (CCR) of not more than 5 or 6 is needed. Given the current material choice and capabilities of coupling optics, there is a limit to which the cladding size can be decreased before the pump coupling efficiency will start to suffer. Given that minimum cladding size, the only way to decrease the clad to core area ratio (CCR) below 5 or 6 is to start making the core larger and larger.

However, the index difference or delta between the core and the inner cladding cannot be made too small, or the optical field will simply not be confined in the core, as already discussed, and the core waveguide will have too much bend loss. Hence, with a given index difference or delta, one can only increase the core diameter 42 of FIG. 5 so much before the core becomes multimoded (up to about 10 um, in practice), unless the core is made with a graded index. It is known that for a given delta, a slightly larger core can still be single moded if the core has a graded index. In the case of a Yb fiber laser operating at 978 nm, the larger size graded index core lowers the gain for the unwanted 1040 nm line. In other cases, especially if the inner cladding waveguide has a noticeable amount of passive loss, a larger size graded index core allows it to absorb the same amount of pump power in a shorter fiber length, increasing the device efficiency. Grading of the core index profile can be achieved, for example, by annealing the core-inner cladding preform or drawing it at a higher temperature, allowing for significant dopant diffusion. When the core is molten and the cladding is softening, diffusional processes are relatively fast, so graded index profiles can be created in situ.

An ultimate version of the graded index is a core that grades down in index all the way to the edge of the outer cladding. Then, there is no defined border between the core and inner cladding, they become one. And still the 0-order or fundamental mode of such a waveguide is confined in its very center with a relatively small mode field diameter (MFD), and the higher order modes fill the total waveguide area more uniformly. Hence, an analog of the area ratio (CCR) is a modal area ratio that is specified rather than the glass layers area ratio.

As discussed, many factors affect the optimum design of a double-clad fiber used as a waveguiding structure. The number of modes and their intensity (field) distribution within the waveguide depend on the waveguide shape, index contrast or index delta $\Delta$, and size.

For the case when a line between the core and the inner cladding (graded index) is hard to draw, the physical cross-sectional area ratio (CCR) is not simply defined. In this unique case of a high-delta graded waveguide used as both the core and the inner cladding of a "double-clad" fiber, the modal area is defined as the physical area where the optical intensity of the mode is higher than $1/e^2$ of its maximum (or electric field amplitude is higher than $1/e$ of its maximum). In other words, when the core and the inner cladding form a single waveguide made of a material with a continuously varying composition such that the refractive index is progressively decreased (graded) from a central part to an edge of the waveguide, the central part of the waveguide is doped with the optically active ion having the three-level transition to form a doped area, then the overlap between the fundamental (zero-order) signal mode of the waveguide with the doped area is preferably designed to not be more than seven times larger than the overlap of all pump modes of the waveguide combined with the doped area.

The direct analog for the physical cross-sectional area ratio (CCR) would then be the ratio of a/b where "a" is the cross-sectional area of all propagating pump modes combined and "b" is the cross-sectional area of the fundamental (zero-order) signal mode. All modes in this case are modes of the graded waveguide which comprise both the core and the inner cladding. However, the pump will use all of these modes and the signal ideally will propagate only in the zero-order one, giving the desired ratio of about 3:1 to 5:1 for a reasonably high delta. This 3:1 to 5:1 modal ratio of the cross-sectional area of all propagating pump modes combined over the cross-sectional area of the single signal mode is especially beneficial for the Yb 3-level laser.

A similar definition can be given for the standard case, when the core and the inner cladding have a clear border, because once again, the pump uses many modes of the cladding and the signal only uses one mode of the core. However, for the standard case this definition would give almost exactly the same numerical value as the physical cross-sectional ratio (CCR).

Optically, for conserving "etendue", the product of the $NA_{clad}$ and spot size of the double-clad fiber 30 has to be equal or greater than the product of the numerical aperture ($NA_{laser}$) and the spot size on the laser diode 72 of FIG. 6. If optics is used to de-magnify the image of the laser emitting area, the same optics will automatically make a beam more divergent, or increase its NA. The inner cladding (serving as a pump waveguide) NA, $NA_{clad}$ must then be equal or higher than that of the incoming beam, to collect all of the light. The general definition for the NA refers to the maximum divergence angle at which a light beam can enter a waveguide and still experience total internal reflection needed for waveguiding. For a typical 100 μm broad stripe laser, the divergence angle parallel to the stripe (slow axis) corresponds to an NA of approximately 0.1. A fiber NA greater than 0.35 is then desired for the efficient coupling of the pump light into a 30 μm core. For a 15 μm core, an NA of 0.7 is needed.

These NA values represent a very high refractive index contrast, or delta between the inner cladding and the outer cladding and are higher than available in standard silica fibers. However, they can be achieved with multi-component glasses. Tantalum silicate and lanthanum aluminum silicate fibers have been fabricated with a high refractive index relative to silica. Antimony silicate fibers using different compositions for the core and the inner cladding have also been fabricated with a high refractive index relative to silica. Almost any multi-component fiber will give a high refractive index, for example, those based on phosphates, lead silicates, and germanates, as the composites. However, the chemical and physical properties of the core must be compatible with the inner cladding, and spectroscopic properties of the dopant must be preserved. It is known that $Yb^{3+}$ and $Nd^{3+}$ can be doped into glasses other than silica and produce nearly the same transition levels.

The NA of the fiber waveguide also relates to the minimum inner cladding size and to the threshold power value for a particular aspect ratio. In general, the higher the fiber NA, the lower the threshold power required. Relatively, the threshold power required for a square inner cladding having a value of unity for the aspect ratio (AR) of the height to the width is the highest. The next highest threshold is for a circular inner cladding. As the aspect ratio of the rectangular multimode inner cladding drops, the threshold power for lasing is significantly decreased. For rectangular aspect ratios of more than $4/\pi$ or 1.27, the rectangular inner cladding has a smaller threshold power for lasing than a circular one. For example, for a waveguide with a numerical aperture of 0.6, the threshold power for lasing is reduced from 900 mW for a circular inner cladding of a 33 μm diameter fiber to 200 mW for a rectangular inner cladding of the fiber waveguide having an aspect ratio of 3 (33 μm×11 μm). These dimensions are consistent with image sizes of broad stripe diode lasers. This reduction in threshold power for lasing is greatly advantageous if a 2W diode is the limit of commonly available broad stripe pump sources.

As is known, for efficient coupling of the pump light, the inner cladding geometry of a double-clad fiber should match the geometry of the pumping diode. Unfortunately, the light emitting spot of a broad-area semiconductor laser is strongly asymmetric, with an aspect ratio of at least 100:1. The beam is typically single-moded (Gaussian) in the fast axis direction (perpendicular to the wafer plane) and strongly multi-moded in the slow axis direction (parallel to the wafer plane). The slow axis direction is the most critical one, ultimately defining the allowable size of the pump waveguide or fiber laser.

Referring to FIGS. 10–14, the present invention teaches a variety of elongated shapes that can be used for the inner cladding 32 of FIG. 5, the most technologically convenient ones being the rectangular inner cladding 321, the "racetrack" inner cladding 322 or the ellipse inner cladding 323. The longer (slow axis) dimension should be at least 10–20% larger than the width of the diode laser aperture ($D_{laser}$ 48 of FIG. 6) times the ratio of the diode slow axis $NA_{laser}$ to the fiber NA. For example, if a 100 μm laser with 0.1 NA is used for pumping and the fiber inner cladding NA is 0.3, then the longer dimension of that cladding should be at least 1.2·100/3=40 μm. To keep the cross-sectional area of the cladding as small as possible, the shorter (fast axis) cladding dimension should be made just large enough to accommodate the single mode core. Resulting aspect ratio of the cladding will then be 1.5:1 or higher. Oblong or an otherwise elongated shape of the inner cladding combined with the relatively small clad-to-core area ratio (CCR), will ensure uniform pump absorption by equalizing pump modes overlap with the doped core. Of the five shapes presented in FIGS. 10–14, including the diamond shaped inner cladding 324 not already mentioned, the "Saturn"-like inner cladding 325, having an elongated center elliptical extension in the middle of a just larger circle than the circle of the core, will have the smallest possible clad-to-core area ratio (CCR) for a given core size.

No attempt has been made to accurately illustrate their relative diameters in the cross-sectional area representations of the active fiber 30 in FIGS. 10–14. However, the area of the inner cladding 32 is preferably approximately less than twenty-five times larger than the area of the core 34. Also, it is possible to use air (n=1) as the cladding.

Referring back to FIGS. 3, 5, and 6, the length 46 of the active fiber 30 is relatively unimportant beyond its being very long compared to the wavelengths involved so that any higher-order modes are adequately attenuated over its length. In practice, this length 46 is determined by the level of rare earth doping in the core and desired pump absorption efficiency. In some circumstances 1 cm in length is more than adequate.

Instead of using a separate focusing element 70 of FIG. 6, the optical characteristics of the broad stripe laser 72 may be good enough to allow direct coupling into the multimode inner cladding 32. However, if a focusing element 70 is needed, techniques have been developed that enable efficient coupling of pump power from broad-area laser diodes having typical emitting apertures with dimensions of 100×1 μm² and NA's of 0.1/0.55 in the slow and fast axes, respectively, into a fiber with a rectangular core cross section of 30×10 μm² and effective numerical aperture of >0.42. The terms "slow" and "fast" refer to the planes that are "parallel" and "perpendicular," respectively, to the laser diode junction plane. In order to efficiently couple light from the broad-area semiconductor laser 72 with emitter dimensions of 100×1 μm² and NA's of 0.1/0.55 in the slow and fast axes (measured at 5% of the maximum far-field intensity points), respectively, coupling optics or other beam shapers 70 can be designed to produce an image of the emitter near field with dimensions of 30×10 μm² and 5% NA's of 0.35/0.12 in the slow and fast axes, respectively.

Regardless of direct coupling or not, the pump signal may be provided by a laser diode 72 of FIG. 6, in the form of AlGaAs or InGaAs broad stripes, arrays, or a diode bar emitting at a wavelength shorter than 976 nm but within the ytterbium absorption band. The practical pump bandwidth extends from 850 to 970 nm with a more preferred range being 910–930 nm and a most preferred range being 915–920 nm. The precise values of these bands and the lasing wavelength may shift by a few nanometers depending upon the dielectric host.

As illustrated in the schematic view of FIG. 6 and FIGS. 10–14, the similar elliptical, rectangular, oblong, or otherwise elongated aspect ratios of the diode or broad-area laser 72 and of the input of the multimode cladding 32 (both vertically or horizontally aligned alike) allows a lens or fiber-optic coupler, optical exciter, or other beam shaper or focusing element 70 to focus the relatively large-size output of a wide stripe or "broad area" laser diode 72 or even a diode bar into the wide multimode cladding 32 of the fiber laser or other types of brightness converter 30. Preferably, the inner cladding 32 has an aspect ratio greater than 1.5 and sized sufficiently small to allow the coupling of pump light from the broad-area laser diode 72 to create sufficient high pump power density. The inner cladding of the double-clad fiber can be drawn into elongated shapes, for example, ellipses or rectangles by various methods. Available methods include triple-crucible draw and the rod-in tube technique, with the parts machined into a desired shape. CVD, OVD, sol-gel, and soft glass in tube are other available methods.

The rectangular, elliptical, oblong, or other elongated cross section of the multimode cladding 32 of FIGS. 10–14 are particularly advantageous because its entrance face 323 can be more easily matched to the emission pattern of a wide stripe laser 72, which may have a width-to-height aspect ratio (AR) of 100:1. That is, the width of the waveguide entrance face 323 can be made substantially greater than its height, which is defined as a high aspect ratio. Even if the coupling optics is designed to form a beam which, when demagnified from the original 100×1 $\mu$m size, has approximately equal NA in both orthogonal directions (advantageous for preserving a high power density), the resulting beam waist will still be substantially wider in the plane of the diode chip than it is in the vertical direction, for example, 30×5 $\mu$m. If the cladding waveguide cross-section matches that shape, then nearly all of the laser diode power can be easily coupled into the waveguide while maintaining a high optical pump power density. The high power density allows a lower power threshold for lasing than that available in circular or square waveguides. Other inner cladding cross-sections of other elongated shapes, for example, elliptical 132, "racetrack", diamond, "saturn", or any other beam-matching shape, can be used to match the shape of the pump emission area. However, it is desirable for the output of the fiber laser or brightness converter 30 to have a substantially circular single-mode transverse field as its output from the core 34. It is desirable for the output of the fiber laser 30 to have a substantially circular mode field because a conventional fiber 20 of FIG. 1 also has a circular mode field and the better the mode field size and shape match, the lower the coupling loss.

For any given NA of the inner cladding, the longer dimension of the double-clad fiber will be fixed by the requirements to couple all of the available pump power (since the size of a broad-area laser emitter is fixed and can be demagnified only by the amount defined by the fiber NA relative to the broad-area laser NA). The second or shorter dimension can then be varied. However, if the longer dimension is the same, an elongated shape with an aspect ratio of 3:1 will have a surface area 3 times less than the one with a 1:1 aspect ratio. Therefore, a corresponding laser with such a smaller surface or cladding area can have roughly a three times lowered threshold. Thus, while it is possible to build a 3 level laser with a known D-shaped inner cladding, the inner cladding with an oval or otherwise elongated shape will provide a significantly lower threshold and therefore higher efficiency. A lot of factors in designing an optimum 3-level double-clad fiber laser relate back to the cladding to core area ratio (CCR). With a given fiber NA and pump laser NA, one of the dimensions of the inner cladding can not be decreased below certain size. But to decrease the surface area as much as possible for higher inversion, in accordance with the teachings of the present invention, the other dimension can be squeezed. Thus, it is preferred that neither the area nor an aspect ratio specification by itself is sufficient for building an efficient device and only complying with both specifications at the same time can provide sufficient inversion and low threshold.

For further modal gain discrimination, other then using the selectivity of the input and output grating mirrors 60 and 52, the shape and dimensions of the fiber's first or inner cladding 32 are chosen from considerations involving maximization of pump power coupling efficiency using anamorphic optics. A 200×1 $\mu$m$^2$ broad-area laser diode 72 near field with NA's of 0.1/0.65 in planes parallel/perpendicular to the junction was transformed to a nominally 30×10 $\mu$m$^2$ spot and coupled with 75% efficiency into the double-clad active fiber 30 with an ellipsoidal first cladding cross section 323 of FIG. 12 having major and minor axes dimensions of 32×16 $\mu$m$^2$. Hence, with an upper bound of 4–5 for the CCR, the core diameter 42 can not be smaller than 10–11 $\mu$m unless the grating mirror loss at 1015 nm is increased beyond the 22–30 dB range. For every micron reduction in diameter, approximately 8 dB of 1015 nm extra loss is required.

On the other hand, a larger core increases the gain of higher-order modes (HOM) of a compound clad-core structure, which can readily lase, hindering diffraction-limited performance. Preferably, the core cross-sectional area is dimensioned such that the higher-order modes of the inner cladding experience a lower overlap with the doped area than the fundamental mode. As the core size increases, the $\Lambda$ factor of HOM's increases, approaching the value for the fundamental mode, leading to reduced differential modal gain discrimination. Therefore, a 32×16 $\mu$m$^2$ inner cladding double-clad fiber was designed with an 11 $\mu$m diameter core, which had an estimated near-threshold gain discrimination of approximately 3 dB between the fundamental mode and highest gain HOM.

When the core becomes large enough to be multimoded, a tapered fiber laser design is beneficial. Instead of a double-clad laser structure, a tapered, stepped or otherwise mode-transformed fiber laser is illustrated in the cross-sectional view in FIG. 4.

Referring to FIG. 4, a "stepped-up" embodiment of the multimode "tapered" fiber laser or a mode-transformed fiber laser where a multimode section 126 is next to a singlemode section 74 is illustrated. In the multimode section, the multimode core portion 126 has the same diameter sized core of the singlemode section but the multimode core 126 has a larger numerical aperture (NA) than the single mode portion 74. However, the cladding 92 of the singlemode portion is larger (or "stepped-up") than the cladding 86 of the multimode section. The multimode portion 126 includes a larger numerical aperture (NA) multimode portion at the input than at the output of the multimode portion for use with a smaller numerical aperture (NA) single mode portion 74 of a multimode to single-mode mode transformer 30 as a tapered fiber laser. Embodied as a stepped fiber laser, this mode transformer 30 has a uniform multimode fiber section 126 with a core 84 and a cladding 86 and a uniform single-mode fiber section 74 with a core 90 and cladding 92. The multimode fiber section 126 receives the pump light 64 and provides most of the optical lasing action.

The single-mode fiber 74 is butt coupled or otherwise joined at a junction 94 to the multimode fiber section 126, for example by a splice or other connection, and effectively outputs a lasing signal 66 that is only the fundamental mode. The mode field diameters of the lowest-order modes are matched in the two fibers sections 126, 74, as is suggested in FIG. 4 by their cores 84, 90 having the same diameter although mode size depends as well on the refractive indices of the core and cladding also. As a result, the multimode fiber section 126 has a larger contrast between its core 84 and cladding 86 and is thus a high-NA fiber or waveguide while the single-mode fiber section 74 has a lesser contrast between its core 90 and cladding 92 and is thus a low-NA fiber or waveguide.

Alternatively, the mode field diameters of the lowest-order modes are matched in the two fibers sections 126, 74, as is suggested in FIG. 4 by their cores 84, 90 having the same diameter only in one axis because the preferred multimode core 84 would be elliptical or rectangular with the same diameter cladding on both the multimode and single mode portions. As a result, the multimode fiber section will still have a larger contrast between its rectangular core 84 and cladding and is thus a high-NA fiber or waveguide while the single-mode fiber section 74 has a lesser contrast between its circular core 90 and cladding and is thus a low-NA fiber or waveguide.

As part of the multimode fiber section 126, the core 94 is doped with an ion optically excitable and having a three-level optical transition when pumped at the pumped end of an optical cavity by a multi-mode pump source 72 at a pump wavelength for lasing at a signal wavelength different than the pump wavelength at the lasing end of the optical cavity provided by the uniform single-mode fiber section 74. Preferably, the core is index-transformed or slightly tapered from the multimode end to the single mode end such that the optically-active fiber is multimoded at said pump wavelength proximate to the multimode end, and is single moded at the signal wavelength proximate to the single mode end.

A first multimode grating 60 is written on an input end of the high-NA waveguide portion 126 for defining an input end of the optical cavity. A single-mode grating 62 is written on the low-NA waveguide portion 74 for defining a second end of the optical cavity. A second multimode grating 56 is written near the output end of the high-NA waveguide portion 126, either as an integral or a spliced portion, for maximally reflecting power of the spatial modes at most wavelengths of the pump bandwidth propagated in the optical cavity.

Referring to FIG. 15, the high-NA waveguide portion is embodied by a multimode core 34 that has a high aspect ratio, such as having a rectangular cross-section from being a rectangular core 342. As with FIG. 4, the single mode output fiber 20 or an optional intervening single mode fiber 74 forms the low-NA waveguide portion. Instead of a uniformly step-transition of the mode-selective filter 300 between the multimode to single mode, this fiber laser uses a slightly sloped or otherwise tapered mode-selective tapered portion 360 to adiabatically transform or otherwise couple the multimode to single mode.

Since one of the basic differences between a single-mode fiber and a multi-mode fiber is their core diameter size difference, the mode transformer 300 of FIG. 4 can alternatively be implemented as anything that basically transitions or couples itself from a larger core diameter to a smaller core diameter to match the multimode to single mode.

In one embodiment of the invention, a rectangular core 35 having an input core cross-section 342, is employed to reduce the active area of the doped core without compromising the coupling efficiency between the pump diode 72 of FIG. 4 and the multimode section 126 to match the elliptically-shaped pump radiation or emission. Other input core cross-sections of other shapes, for example, elliptical or any other matching-beam shape, can be used to match the shape of the pump emission area. However, it is desirable for the output of the fiber laser to have a substantially circular mode field as its output cross-section or core diameter 340. It is desirable for the output of the fiber laser to have a substantially circular mode field because a conventional single mode fiber has a circular mode field and the better the mode field size and shape match, the lower the coupling loss. Even though the core 34 can be of other shapes, the rectangular aspect is preferred for this fiber laser application since the pump laser diode 72 also has a rectangular beam.

In one exemplary way to form the multimode section 126, the rectangular core material 34 is placed within a cladding tube 36 which has a lower refractive index than the core's refractive index. Optionally, for extra stability or for further aspect ratio control, an overclad tube, cane, sleeve, or jacket 360 made of the same cladding material as the first cladding tube or some other composition such that the overclad has a refractive index the same as the first cladding tube or lower to control the numerical aperture of the transformed fiber by building up more cladding material around the aperture or reduce the aperture, respectively. An exemplary composition of the optional overclad tube 360 is boron doped silica.

Since the core glass 34 is selected to be of a different material such that it is much softer than the pure silica cladding 36, the core glass 34 will be very fluid and conform to the geometry dictated by or conform to the cladding 36 when heated to the temperatures required to draw fiber and, according to the teachings of the present invention, to slightly taper the resulting fiber into having a suitable output 40 for coupling to a single mode fiber. The shape of the core does not matter, it is more significant that the NA can be dropped and the shape can be made more circular with soft glass cores. The fluid core 34 will begin to dissolve the silica clad 36, lowering the refractive index of the core 34 and providing a better NA match to standard single-mode fibers 20 on the output end of the taper 340.

If the core is rectangular, the dissolution or glass mixing rate is faster in the direction of the minor axis due to mass transport constraints along the major axis. The core 34 can be initially made rectangular by starting with a cladding tube having a rectangular channel, groove, or other shaped aperture, inside the tube for depositing core cullets within.

Because the core is much softer than the cladding, the core will become a liquid during the tapering process in between sealed ends of the fiber. The thermal expansion of a liquid glass is two to three times that of a solid glass, causing the core to become pressurized. The hydrostatic pressure in the core will exert a force proportional to the area on which it acts. Hence the larger sides of a rectangular or elliptical core will experience a greater outward force pushing the sides into a more circular output cross-section. Thus the aspect ratio of a mode transforming or NA transforming taper can be reduced, in accordance with the teachings of the present invention, from the larger rectangular input cross-section 342 to the smaller circular output section 340, as the neckdown region 102 is drawn and the aspect ratio and NA of the core are both reduced by core diffusion/dissolution and expansion. More specifically, the taper or neckdown region 102 is made by heating a section of the fiber 126 and pulling it under tension. The tension is provided by another outer tube, outer cladding, or sleeve (housing or preform) surrounding the optional over-clad 360, or replacing it, through which the rectangular core fiber 36 was originally inserted through so that it now surrounds and changes shape as the fiber 36 is heated and drawn to the desired configuration. Preferably, the material of the overclad tube or housing is made from the same or similar cladding material, such as boron doped silica.

It is possible to pump directly into a tapered waveguide. However, the taper angle must be further reduced so that the pump light does not leak out of the tapered waveguide in the neckdown region 102. It is generally preferred to not begin tapering until a significant fraction of the pump light is absorbed and not to taper too much.

Thus an initially rectangular multi-mode waveguide 342 can be transformed by tapering or otherwise coupling to a single-mode or a few-mode waveguide 40 of substantially circular geometry and with a reduced NA. This method has been successfully employed in transforming a 30×10 micron rectangular core glass 34 of a multi-component silicate glass at the multi-mode rectangular input to an output mode closely matched to a CS980 single-mode fiber 20. Preferably, the multi-component silicate glass is $83.5SiO_2$ $9.8Al_2O_3$ $4.2La_2O_3$ $2.5GeO_2$+ an appropriate rare-earth ion dopant (in mole %). Even though other single-mode fibers are usable, the single-mode fiber 20 is the CS980 single-mode fiber made by Corning, Inc. for propagating wavelengths at 980 nm and having a standard 125 micron diameter for the overall fiber. A loss of less than 0.5 dB has been achieved with this mode transformer mode-matched to the CS980 fiber 20.

Since the core is molten and the cladding is softening, diffusional processes are relatively fast, so graded index profiles can be created in situ. With appropriate choices of cladding material, the transformed fibers produced can be fusion spliced to conventional fibers making the transformed fibers quite practical in existing fiber networks and easing device manufacturing.

A first multimode grating 60 is written across the rectangular core on an input end of the high-NA waveguide portion 126 for defining an input end of the optical cavity. Another grating 62, multimode, single mode, or in between, is written across the circular core on the low-NA waveguide portion 40 for defining a second end of the optical cavity. Optionally, the grating 62 can instead be a single mode grating written across the circular mode of the single-mode fiber 20. A second multimode grating 56 is written on either the high-NA waveguide portion 126 or across the core of the mode-selective tapered portion 102 for maximally reflecting power of the spatial modes at most wavelengths of the pump bandwidth propagated in the optical cavity. Hence, the pump reflector 56 would preferentially be written in the host cavity fiber, inside the mode selective taper, but could also be placed outside the taper and/or be written in a different fiber which is spliced to the cavity fiber.

Written across the rectangular core 34, the fiber Bragg grating input mirror 60 has been designed to reflect the fundamental mode at the lasing wavelength of 980 nm and transmit both the pump band at 920 nm and the Yb-fiber gain peak at 1030 nm. In one example, a multimode fiber with an effective numerical aperture ($NA_{eff}$) of 0.45 has a core index of approximately 1.53, when the cladding index $n_{clad}$=1.456. Reflection of the fundamental mode at about the lasing wavelength 978 nm requires a grating period $\Lambda$=0.320 $\mu$m ($\Lambda_{mask}$=0.640 $\mu$m where the mask period is twice the grating period). The shortest wavelength (highest order mode) for which the Bragg condition will be met ($n_{eff} \sim n_{clad}$) with this mask is at 932 nm, so no pump modes will be affected by the grating. This FBG mirror 60 at about the lasing wavelength of 978 nm would also eliminate feedback near the undesired four-level 1030 nm Yb gain peak since no modes at 1030 nm meet the Bragg condition.

Referring to FIG. 7, the reflection spectrum of a sample input mirror implemented as the multimode fiber Bragg grating (MM FBG) 60 of FIG. 15 is shown. As one way of implementing the multimode gratings, such multimode input mirrors 60 have been UV-written in a $GeO_2$ doped $Al_2O_3$—$La_2O_3$—$SiO_2$ multi-component silica fiber for use as a dummy multimode or un-actively-doped portion, similar to that used in a Yb-doped tapered fiber laser (YTFL). Specifically, the grating is written across the rectangular core of a conventionally melted Ge-doped $Al_2O_3$—$La_2O_3$—$SiO_2$ multi-component glass fiber. In this example, the grating was written at 244 nm using a 637 nm uniform phase mask. This grating closely approximates a target dielectric input mirror (highly reflective at 980 nm, highly transmissive at both 920 nm and 1030 nm). As can be seen, the fundamental reflected peak appears at 979.7 nm. Other higher order peaks appear at shorter wavelengths. No power is reflected in either the undesired four-level 1030-nm or the pump 920-nm bands.

Figure 16:
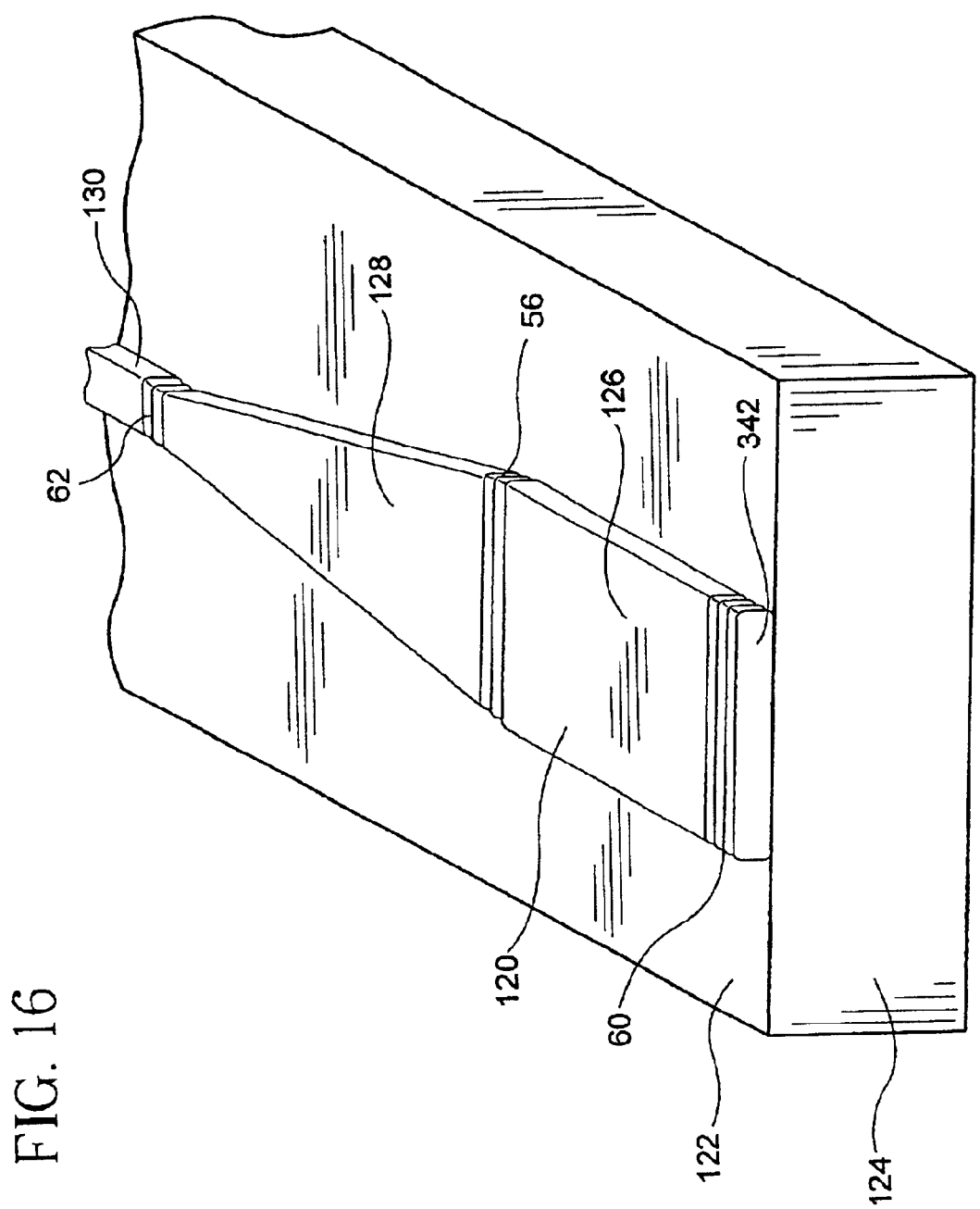
FIG. 16 is a perspective illustration of using the active fiber 30 of FIG. 2, as a tapered planar embodiment of a fiber laser, according to the present invention.

As with the double-clad structure, cylindrical fibers are only one example of dielectric waveguides that can be used as a tapered fiber laser. Fiber can be drawn into other shapes, for example, ellipses or rectangles. Furthermore, rectangular dielectric waveguides can be formed on planar substrates by techniques similar to those used in semiconductor fabrication or other techniques, such as ion-exchange, sputtering, plasma enhanced chemical vapor deposition, flame hydrolysis, and $LiNbO_3$ technology including diffusion doping. A simple tapered fiber laser example of such a planar waveguide is illustrated schematically in the orthographic view of FIG. 16. A rib waveguide 120 is formed on the top surface 122 of a dielectric substrate 124 having a lower refractive index than that of the rib waveguide 120. A separate un-illustrated upper cladding may be formed over the rib waveguide 120 or air can serve as the upper cladding. The rib waveguide 120 includes a rectangular doped multimode section 126, a rectangular tapered section 128, and a substantially squared single mode section 130.

Other forms of planar waveguides are possible, including those tapered in two dimensions and those having a stepped transition between the multimode and single mode sections and others between a double-clad and single mode sections. The formation of a rectangular waveguide on a planar substrate is additionally advantageous because it allows the integration of the laser diode on the same substrate. Similar structures can be drawn from a preform.

The rectangular cross section of the multimode section 126 is particularly advantageous because its entrance face 342 can be more easily matched to the emission pattern of a wide stripe laser, which may have a height-to-width aspect ratio (AR) of 1:100. That is, the width of the entrance face 132 can be made substantially greater than its height, which will be defined as a high aspect ratio. Further, the height can be made to correspond to a single mode, thus eliminating the need for vertical tapering. The light emission from a broad stripe laser may be considered as an image being focused on the waveguide face 132. The image of a broad stripe diode laser is substantially wider in the plane of the diode chip than it is in the vertical direction, for example, tens of microns versus a few microns. Thereby, nearly all of the laser diode power can be easily coupled into the waveguide while maintaining a high optical pump power density. The high power density allows a lower power threshold for lasing than that available in circular or square waveguides.

A first multimode grating 60 is written across the rectangular doped multimode section 126 on an input end of the high-NA waveguide portion 126 for defining an input end of the optical cavity. Another grating 62, multimode, single mode, or in between, is written across the substantially squared single mode section 130 on the low-NA waveguide portion for defining a second end of the optical cavity. Optionally, the grating 62 can instead be a single mode grating written across the circular core of the single-mode fiber 20 of FIG. 1 to couple with the single mode section 130. A second multimode grating 56 is written on either the high-NA waveguide portion 126 or across the core of the mode-selective tapered portion 128 for maximally reflecting power of the spatial modes at most wavelengths of the pump bandwidth propagated in the optical cavity.

In summary, multimode fiber Bragg gratings (MM FBGs) can be incorporated into fiber laser cavities to serve as signal mirrors and/or to serve as pump reflectors. MM FBGs have been demonstrated in multimode rectangular core and elliptical core fibers similar to those used in double-clad fiber lasers and tapered fiber lasers. The chirped MM-FBG in the elliptical core Yb-doped OVD fiber demonstrates that a MM-FBG based pump-reflector is feasible for a double-clad or tapered fiber laser cavity. The uniform grating in a rectangular cored YTFL fiber demonstrates that a grating-based input mirror could be a viable alternative to a thin-film or micro-sheet mirror approach. The MM-FBGs demonstrated in the conventionally melted glasses for the YTFL fiber and the OVD powder-doped double-clad fiber are the first successes of MM-FBGs written in non-circular fiber cores. Even though these MM-FBGs have been demonstrated for use in a Yb-doped tapered fiber laser, they can also be extended to other laser cavities using multi-mode fiber, e.g., a double-clad fiber laser, as well as to fiber lasers using dopants other than ytterbium. These gratings offer increased device reliability, simpler packaging, and manufacturing cost savings over the existing dielectric mirror deposition technologies.

It will be apparent to those skilled in the art that various modifications and variations to the options and design criteria of the double-clad or tapered fiber laser structure, such as the lens, coupling scheme, and other components of the optical package can be made to the present invention without departing from the spirit and scope of the invention. Thus, it is intended that the present invention covers the modifications and variations of this invention provided they come within the scope of the appended claims and their equivalents.

What is claimed is:

1. An optically-active waveguide laser, comprising:
   a multimode input signal grating;
   a multimode output signal grating;
   a length of rare earth-doped waveguide disposed between the multimode input signal grating and the multimode output signal grating for defining an optically-active cavity for lasing at a signal lasting wavelength of an output signal in response to optical pumping from an input pump having a pump bandwidth including a predetermined wavelength, the length of rare earth-doped waveguide having
      a multimode portion for carrying more than one spatial mode at the predetermined wavelength, the multimode portion having a first refractive index, and
      a cladding portion proximate the multimode portion and having a second refractive index lower than the first index for power enhancement; and
   a multimode pump reflector grating written near the multimode output signal grating for maximally reflecting power at most wavelengths of the pump bandwidth propagated in the multimode portion by the pump and for reflecting most of the spatial modes of most of the wavelengths in the pump bandwidth to increase pump absorption efficiency with the given length of rare earth doped waveguide.

2. The laser of claim 1, wherein the multimode portion comprises a multimode inner cladding fiber region doped with a photosensitive dopant for inscribing fiber Bragg gratings in the multimode inner cladding fiber region.

3. The laser of claim 2, wherein the dopant comprises Germania.

4. The laser of claim 1, wherein the multimode portion comprises a multimode non-circular core region doped with a photosensitive dopant for inscribing fiber Bragg gratings in the multimode non-circular core region.

5. The laser of claim 4, wherein the multimode non-circular core region comprises a rectangular core.

6. The laser of claim 4, wherein the multimode non-circular core region comprises an elliptical fiber core.

7. The laser of claim 4, wherein the dopant comprises Germania.

8. The laser of claim 1, wherein the multimode pump reflector grating is written on an output section of the multimode portion having a high reflectivity of about 100% at the pump bandwidth.

9. The laser of claim 1, wherein the multimode input signal grating comprises a multimode signal mirror spaced apart from the multimode pump reflector grating for reflecting the fundamental mode of the signal wavelength as the predetermined wavelength lased by propagation in the multimode portion.

10. The laser of claim 9, wherein the multimode signal mirror has a grating period associated with the fundamental mode of the signal wavelength.

11. The laser of claim 9, wherein the multimode signal mirror reflects higher order modes at other wavelengths different from the signal wavelength wherein the other wavelengths are not within the gain peak of the laser.

12. The laser of claim 9 wherein the signal mirror comprises a cavity high reflector having a high reflectivity and is written on an input end of the laser and having a grating bandwidth less than 0.5 nm.

13. The laser of claim 1 wherein the multimode output signal grating comprises an output signal mirror coupler having a low reflectivity at the signal wavelength.

14. The laser of claim 1, wherein the multimode portion comprises a multimode dielectric planar waveguide for carrying more than one spatial mode at the predetermined wavelength of the input pump pumping the laser at the predetermined wavelength of the pump wavelength.

15. The laser of claim 8, wherein the multimode pump reflector grating has a low reflectivity of less than 5–15% at the signal lasing wavelength for not reflecting most of the fundamental mode of the signal lasing wavelength propagated within the cavity of the laser by the input pump.

16. The laser of claim 15, wherein the multimode pump reflector grating has a grating period between a minimum grating period associated with the fundamental mode of the pump wavelength and a maximum grating period comprising the lesser grating period associated with one of the fundamental mode of the signal wavelength or of the highest mode of the pump wavelength.

17. The laser of claim 16 wherein the grating period is varied for chirping the multimode pump reflector to accommodate most of the pump modes spanning a range of effective indices of refraction.

18. The laser of claim 17 wherein the range of effective indices of refraction is about 0.14.

19. The laser of claim 16 wherein the maximum grating period is determined by the effective index of a high order mode in the range of the $30^{th}$ to $50^{th}$ mode when the core index is about 1.55.

20. The laser of claim 16 wherein the grating period is between 240 and 319 nm.

21. The laser of claim 1, wherein the multimode portion comprises a larger numerical aperture (NA) multimode portion at the input than at the output of the multimode portion for use with a smaller numerical aperture (NA) single mode portion of a multimode to single-mode mode transformer as a tapered fiber laser.

22. The laser of claim 1, wherein the multimode portion comprises a larger diameter fiber portion having an inner cladding surrounding the smaller diameter of a rare-earth doped fiber core of a double-clad fiber.

23. A multimode to single mode fiber laser comprising:
an optical pump source providing a pump light at a pump wavelength within a pump bandwidth; and
an optically active cavity pumped by the optical pump source, the optically-active cavity including:
a first waveguide portion optically pumped at the pump wavelength for lasing with an emission at a lasing wavelength, wherein the first waveguide portion having a multimode rare earth-doped core proximate a cladding such that the multimode core exhibits multi-transverse-mode behavior at the lasing wavelength and at the pump wavelength;
a second waveguide portion exhibiting a substantially single transverse mode behavior at the lasing wavelength optically coupled with the first waveguide portion;
a mode-selective tapered portion optically coupled in between the first and second waveguide portions, the tapered portion tapering from a larger core section to a smaller core section for selecting the substantially single transverse mode from the multi-transverse-modes;
a first multimode grating written near an input end of the multimode rare earth-doped core of the first waveguide portion for defining an input end of the optically-active cavity;
a single-mode grating written near the second waveguide portion for defining a second end of the optically-active cavity; and
a second multimode grating written near at least one portion of the multimode rare earth-doped core of the first waveguide portion and the mode-selective tapered portion, the second multimode grating having a high reflectivity of about 100% at the pump bandwidth for maximally reflecting power of the spatial modes at most wavelengths of the pump bandwidth propagated in the optically-active cavity to increase pump absorption efficiency with a given length of the multimode rare earth-doped core.

24. The laser of claim 23, wherein the first and second multimode gratings spaced apart from each other are each written on a pair of multimode dummy portions spliced to a doped gain portion of the first waveguide portion for forming a pumped cavity within the optically-active cavity.

25. A double-clad fiber laser comprising:
an optical pump source providing a pump light at a pump wavelength within a pump bandwidth; and
an optically-active cavity pumped by the optical pump source, the optically-active cavity including:
a first waveguide portion optically pumped at the pump wavelength for lasing with an emission at a lasing wavelength, wherein the first waveguide portion exhibits multi-transverse-mode behavior within an inner cladding at the lasing wavelength;
a rare earth-doped core proximate the inner cladding for providing the active gain medium for the optically-active cavity;
a second waveguide portion exhibiting a substantially single transverse mode behavior at the lasing wavelength optically coupled with the first waveguide portion;
a first multimode grating written on an input end of the inner cladding of the first waveguide portion for defining an input end of the optically-active cavity;
a single-mode grating written on the cladding of the second waveguide portion for defining a second end of the optically-active cavity; and
a second multimode grating written near the inner cladding of the first waveguide portion and spaced from the first multimode grating, the second multimode grating having a high reflectivity at the pump bandwidth for maximally reflecting power of the spatial modes at most wavelengths of the pump bandwidth propagated in the optical cavity to increase pump absorption efficiency with a given length of the multimode rare earth-doped core.

26. The laser of claim 25, wherein the first and second multimode gratings spaced apart are each written on a pair of double-clad un-actively-doped portions closely spliced to a doped gain portion of the first waveguide portion for forming a pumped cavity within the optically-active cavity.

27. The double-clad fiber of claim 25, wherein the first waveguide portion comprises:
the rare earth-doped core, doped with an optically excitable ion having a three-level transition, the core having a core refractive index and a core cross-sectional area;
the inner cladding exhibiting multimode, surrounding the core, the inner cladding having an inner cladding refractive index less than the core refractive index, the inner cladding having an inner cladding cross-sectional area between 2 and 25 times greater than that of the core cross-sectional area, and the inner cladding having an aspect ratio greater than 1.5:1; and
an outer cladding surrounding the inner cladding, the outer cladding having an outer cladding refractive index less than the inner cladding refractive index.

28. The laser of claim 27, wherein the core is sized sufficiently small such that the core supports only one transverse mode at the output signal wavelength, and the only one transverse mode has a mode field diameter equal to that of a standard single mode fiber for optimum coupling.

29. The laser of claim 27, wherein the core is doped with the optically excitable Yb ion having the three-level transition at about 980 nm, the inner cladding having the inner cladding cross-sectional area between 2 and 8 times greater than that of the core cross-sectional area.

30. The laser of claim 27, wherein the core and the inner cladding are made from different compositions of antimony-silicate glass.

31. The laser of claim 27, wherein the difference between the outer cladding refractive index and the inner cladding refractive index is large enough to ensure that the inner cladding numerical aperture $NA_{clad}$ satisfies the condition $$NA_{clad} > NA_{laser} * D_{laser}/D_{clad},$$

where $NA_{laser}$ is the numerical aperture of a broad-area pump laser in a slow axis, $D_{laser}$ is the size of the broad-area laser light emitting aperture in a slow axis and $D_{clad}$ is the longer dimension of the inner cladding.

32. The laser of claim 27, wherein the difference between the outer cladding refractive index and the inner cladding refractive index is large enough to provide a numerical aperture (NA) greater than 0.3.

33. The laser of claim 27, wherein the inner cladding is made from a glass having a coefficient of thermal expansion (CTE) mismatch with the material of the outer cladding of less than $+/-30 \times 10^{-7}/°$ C. over the range 0–200° C.

34. The laser of claim 27, wherein the core is made from a glass having a coefficient of thermal expansion (CTE) mismatch with the material of the inner cladding of less than $+/-30 \times 10^{-7}/°$ C. over the range 0–200° C.

35. The laser of claim 27, wherein the core has a graded index.

36. The laser of claim 27, wherein the inner cladding has a generally rectangular cross-section for providing the multimode interaction with the first and second multimode gratings.

37. The laser of claim 27, wherein the inner cladding has a generally elliptical cross-section for providing the multimode interaction with the first and second multimode gratings.

38. The laser of claim 27, wherein the inner cladding has a generally elongated cross-section for providing the multimode interaction with the first and second multimode gratings.

39. The laser of claim 27 wherein the inner cladding has a generally "Saturn"-like shape for providing the multimode interaction with the first and second multimode gratings.

40. The laser of claim 25, wherein the second multimode grating comprises a pump reflector inscribed in the inner cladding surrounding the multimode rare earth-doped core of the first waveguide portion the pump reflector having the high reflectivity of about 100% at the pump bandwidth.

41. The laser of claim 25, wherein the first multimode grating comprises at least one cavity mirror inscribed in the inner cladding surrounding the multimode rare earth-doped core of the first waveguide portion.

42. The laser of claim 27, wherein the optically excitable ion is Yb for use as a Yb double-clad fiber laser for pumping an Er-doped fiber amplifier (EDFA).

43. The laser of claim 27, wherein the core cross-sectional area is dimensioned such that the higher-order modes of the inner cladding experience a lower overlap with the doped area than the fundamental mode.

44. The laser of claim 25, wherein the second waveguide portion comprises an intra-cavity transverse-mode-selective element coupled near the output of the first waveguide portion for selecting the lowest transverse lasing mode.

45. The laser of claim 25, wherein the optical pump source comprises a broad-area laser diode having a pump light having an output power of at least 1-Watt.

46. The laser of claim 45, wherein the first waveguide portion comprises a double-clad optically active fiber having the input end for receiving the pump light and a coupling end for coupling to second waveguide portion for outputting a laser signal, the double-clad optically active fiber including a core for supporting close to a single-mode transmission of the laser signal, the core having a cross-sectional core area, the core doped with a plurality of optically excitable dopants having a transition requiring a high level of inversion at a desired signal wavelength of the laser signal;

the inner cladding disposed adjacent to the core having an aspect ratio greater than 1.5 and configured sufficiently small to match a laser mode field geometry of the pump light to allow the inner cladding to optically deliver the pump light to the core at a high pump power density, the inner cladding having a cross-sectional area approximately 2 to 25 times larger than the core area to allow a sufficiently high overlap between dopants in the core and the pump light, such that the high pump power density and the high overlap between dopants and the pump light provide the required level of inversion for lasing with a low power threshold and high efficiency for providing a high power output of at least 3W; and an outer cladding disposed adjacent to the inner cladding having an index of refraction less than the inner cladding for confining the pump light.

* * * * *